US010257518B2

(12) United States Patent
Zhang et al.

(10) Patent No.: US 10,257,518 B2
(45) Date of Patent: Apr. 9, 2019

(54) VIDEO FRAME FADE-IN/FADE-OUT DETECTION METHOD AND APPARATUS

(71) Applicant: Huawei Technologies Co., Ltd., Shenzhen (CN)

(72) Inventors: Lei Zhang, Beijing (CN); Zhigang Yao, Shenzhen (CN); Qingpeng Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 614 days.

(21) Appl. No.: 14/924,502

(22) Filed: Oct. 27, 2015

(65) Prior Publication Data

US 2016/0050418 A1  Feb. 18, 2016

Related U.S. Application Data

(63) Continuation of application No. PCT/CN2014/076257, filed on Apr. 25, 2014.

(30) Foreign Application Priority Data

Apr. 27, 2013 (CN) .......................... 2013 1 0152569

(51) Int. Cl.
   *H04N 19/137* (2014.01)
   *H04N 19/142* (2014.01)
   (Continued)

(52) U.S. Cl.
   CPC ......... *H04N 19/137* (2014.11); *H04N 19/103* (2014.11); *H04N 19/109* (2014.11);
   (Continued)

(58) Field of Classification Search
   CPC ........................... H04N 19/137; H04N 19/103
   See application file for complete search history.

(56) References Cited

U.S. PATENT DOCUMENTS 5,691,774 A * 11/1997 Yasuda ................. H04N 5/145
                                                     348/E5.066
5,771,316 A    6/1998 Uz
                    (Continued)

FOREIGN PATENT DOCUMENTS

CN        1507751 A     6/2004
CN     101072342 A    11/2007
                    (Continued)

OTHER PUBLICATIONS

Kashio, T, "Detection of Fading-In/Out Text Regions from MPEG Videos based on a Markov Model", Picture Coding Symposium, Nov. 2007, Lisbon.

(Continued)

*Primary Examiner* — Jonathan R Messmore
(74) *Attorney, Agent, or Firm* — Slater Matsil, LLP

(57) ABSTRACT

A video frame fade-in/fade-out detection method is provided, the detection method includes: before motion search, performing inter-frame comparison on block direct current components in some rows of a picture or performing inter-frame comparison on block direct current components in a partial area of a picture; collecting statistics on an inter-frame comparison result; determining whether fade-in/fade-out exists, to choose whether prediction is in a weighted mode; and if it is detected, by means of inter-frame comparison on block direct current components on some rows, that no global fade-in/fade-out exists, selecting a partial area within a range of some detected rows to perform inter-frame comparison on block direct current components again, and detecting local fade-in/fade-out. In the present invention, fade-in/fade-out is detected under the premise that easy hardware implementation is ensured, which saves a bandwidth and improves block match accuracy; in addition, the (Continued)

present invention proposes a solution for local fade-in/fade-out.

19 Claims, 8 Drawing Sheets

(51) Int. Cl.
| | |
|---|---|
| H04N 19/87 | (2014.01) |
| H04N 19/176 | (2014.01) |
| H04N 19/109 | (2014.01) |
| H04N 19/577 | (2014.01) |
| H04N 19/103 | (2014.01) |
| H04N 19/182 | (2014.01) |
| H04N 19/186 | (2014.01) |

(52) U.S. Cl.
CPC ......... *H04N 19/142* (2014.11); *H04N 19/176* (2014.11); *H04N 19/182* (2014.11); *H04N 19/186* (2014.11); *H04N 19/577* (2014.11); *H04N 19/87* (2014.11)

(56) References Cited

U.S. PATENT DOCUMENTS

| | | |
|---|---|---|
| 6,327,390 B1 | 12/2001 | Sun et al. |
| 6,449,392 B1 | 9/2002 | Divakaran et al. |
| 6,459,459 B1 | 10/2002 | Ratakonda |
| 2004/0057523 A1* | 3/2004 | Koto ..................... H04B 1/662 |
| | | 375/240.26 |
| 2006/0139497 A1 | 6/2006 | Caviedes |
| 2007/0058719 A1 | 3/2007 | Date et al. |
| 2009/0109341 A1 | 4/2009 | Oguz et al. |
| 2013/0163666 A1* | 6/2013 | Leontaris ......... H04N 19/00569 |
| | | 375/240.12 |

FOREIGN PATENT DOCUMENTS

| | | |
|---|---|---|
| CN | 101088280 A | 12/2007 |
| CN | 101836431 A | 9/2010 |
| CN | 102497556 A | 6/2012 |
| EP | 1021042 A1 | 7/2000 |
| EP | 1053635 B1 | 11/2000 |
| WO | 9935825 A1 | 7/1999 |
| WO | 2012031107 A1 | 3/2012 |

OTHER PUBLICATIONS

Zhang, R. "Accurate Parameter Estimation and Efficient Fade Detection for Weighted Prediction in H.264 Video Compression", 15th IEEE International Conference on Image Processing: ICIP 2008, Oct. 12-15, 2008, pp. 2836-2839, San Diego, CA.

\* cited by examiner

VIDEO FRAME FADE-IN/FADE-OUT DETECTION METHOD AND APPARATUS

This application is a continuation of International Application No. PCT/CN2014/076257, filed on Apr. 25, 2014, which claims priority to Chinese Patent Application No. 201310152569.5, filed on Apr. 27, 2013, both of which are hereby incorporated by reference in their entireties.

TECHNICAL FIELD

The present invention relates to the field of communications technologies, and in particular, to a video frame fade-in/fade-out detection method and apparatus.

BACKGROUND

In modern times, as the living standard of people improves, video applications are increasingly widely applied in both Internet transmission and handheld terminal playback. However, because an existing transmission bandwidth is limited, it is required that a video bandwidth is compressed and the coding efficiency is improved as much as possible. In addition, some devices such as a television terminal have a high requirement on a frame rate during video playback, but a limited bandwidth determines that a high frame rate cannot be reached during transmission. Therefore, to achieve an effect of smooth playback, a frame rate conversion module or the like needs to be added, and in this case, effective video processing is required, so as to achieve an ideal effect.

In video technology application, because motion estimation is a common method for eliminating video redundancy, motion estimation is needed for both video coding and decoding and video processing. However, in a specific scenario, pixel based motion estimation match has a rather high requirement on pixel precision. If fade-in/fade-out or the like occurs, match accuracy is affected. Therefore, to improve motion estimation match accuracy, we need to detect a fade-in/fade-out scenario to perform effective processing.

A known method provides a video frame detection method, including collecting statistics on pixels of a single-frame picture of a video to obtain a histogram of the pixels of the picture, where the histogram identifies the number of occurrences of each pixel in a single-frame picture; comparing a relationship between histograms of contiguous frames to determine similarity of the histograms and an overall offset of an inter-frame direct current component. The method also includes determining whether fade-in/fade-out exists in a current video frame; and if the fade-in/fade-out exists, using a weighted prediction method during motion estimation match, so as to improve match accuracy.

It is found that this method has at least the following defects. First, in this method, entire-frame detection needs to be first performed according to a current picture and a reference frame, and processing is then performed; therefore, a delay exists. Second, during hardware implementation, a picture needs to be first loaded to perform fade-in/fade-out detection, and picture data needs to be loaded again during motion estimation match; therefore, the burden of bandwidth is increased. Finally, in this method, only a global fade-in/fade-out case is considered, and detection and processing on local fade-in/fade-out cannot be performed.

Another known method considers both global fade-in/fade-out and local fade-in/fade-out. The method includes calculating a residual by using both a direct match method and a weighted prediction method during motion estimation match, then comparing the residuals of the two methods; and then selecting a method having a smaller residual, and marking whether weighted prediction is used.

According to this method, the inventor finds that defects of this method are also rather obvious. That is, if this prior art is applied to the frame rate conversion module, this method is very likely to cause wrong estimation on local fade-in/fade-out in a case without local fade-in/fade-out, thereby affecting motion vector calculation accuracy.

SUMMARY

According to a first aspect, a video frame fade-in/fade-out detection method is provided. The method includes acquiring pixel luminance information within a preset area of a current video frame, and calculating, on a block basis according to the acquired pixel luminance information within the preset area of the current video frame, a direct current component of a unit pixel block located within the preset area of the current video frame, to acquire the block direct current component of the unit pixel block. The method also includes acquiring pixel luminance information of a reference pixel block, in a reference frame corresponding to the current video frame, corresponding to the unit pixel block located within the preset area of the current video frame. The method also includes calculating a block direct current component of the reference pixel block according to the pixel luminance information of the reference pixel block; comparing the acquired block direct current component of the unit pixel block located within the preset area of the current video frame with the direct current component, of the reference pixel block in the reference frame, corresponding to the direct current component of the unit pixel block located within the preset area of the current video frame. The method also includes collecting statistics on a comparison result of the direct current components, and determining, according to a statistics collection result, whether fade-in/fade-out exists; and marking, when it is detected that fade-in/fade-out exists, a current to-be-processed object, so that motion match is performed by using a weighted prediction mode.

With reference to the first aspect, in a first possible implementation manner of the first aspect, the comparing the acquired block direct current component of the unit pixel block located within the preset area of the current video frame with the direct current component, of the reference pixel block in the reference frame, corresponding to the direct current component of the unit pixel block located within the preset area of the current video frame includes: comparing the block direct current component $DC0_{ij}$ of the unit pixel located within the preset area of the current video frame with the direct current component $DC1_{ij}$ of the reference pixel block in the reference frame, corresponding to the direct current component of the unit pixel block located within the preset area of the current video frame, to $fFlag_{ij}$, where $fFlag_{ij}$ is obtained according to the following relation:

$$fFlag_{ij} = \begin{cases} 1 & DC0_{ij} < DC1_{ij} \\ 0 & DC0_{ij} > DC1_{ij} \end{cases};$$

and

Correspondingly, the collecting statistics on a comparison result of the direct current components, and determining, according to a statistics collection result, whether fade-in/fade-out exists includes separately collecting, according to the following formulas, statistics on a quantity fiNum$_g$ of unit pixels within the preset area of the current video frame and satisfying that the block direct current component DC$0_{ij}$ is less than the direct current component DC$1_{ij}$, of the reference pixel block in the reference frame, corresponding to the direct current component of the unit pixel block located within the preset area of the current video frame, and a quantity foNum$_g$ of unit pixels within the preset area of the current video frame and satisfying that the block direct current component DC$0_{ij}$ is greater than the direct current component DC$1_{ij}$, of the reference pixel block in the reference frame, corresponding to the direct current component of the unit pixel block located within the preset area of the current video frame.

fiNum$_g$=ΣfFlag$_{ij}$; and foNum$_g$=Σ(1−fFlag$_{ij}$); and if fiNum$_g$>R or foNum$_g$>R, determining that fade-in/fade-out exists in the unit pixel block within the preset area of the current video frame, where R is a preset threshold for determining fade-in/fade-out.

With reference to the first aspect or the first possible implementation manner of the first aspect, in a second possible implementation manner, the acquiring pixel luminance information within a preset area of a current video frame includes acquiring the pixel luminance information within a range of a current row and total L surrounding rows within the current video frame. The calculating, on a block basis according to the acquired pixel luminance information within the preset area of the current video frame, a direct current component of a unit pixel block located within the preset area of the current video frame, to acquire the block direct current component of the unit pixel block includes calculating, on a block basis according to the pixel luminance information within the range of the current row and the total L surrounding rows within the current video frame, a direct current component of a unit pixel block located within the range of the current row and the total L surrounding rows within the current video frame, to acquire the block direct current component of the unit pixel block. The acquiring pixel luminance information of a reference pixel block, in a reference frame corresponding to the current video frame, corresponding to the unit pixel block located within the preset area of the current video frame includes acquiring pixel luminance information of a reference pixel block, in the reference frame corresponding to the current video frame, corresponding to the unit pixel block located within the range of the current row and the total L surrounding rows within the current video frame. The comparing the acquired block direct current component of the unit pixel block located within the preset area of the current video frame with the direct current component, of the reference pixel block in the reference frame, corresponding to the direct current component of the unit pixel block located within the preset area of the current video frame includes comparing the acquired block direct current component of the unit pixel block located within the range of the current row and the total L surrounding rows within the current video frame with the direct current component, of the reference pixel block in the reference frame, corresponding to the direct current component of the unit pixel block located within the range of the current row and the total L surrounding rows within the current video frame. The marking, when it is detected that fade-in/fade-out exists, a current to-be-processed object, so that motion match is performed by using a weighted prediction mode includes marking all unit pixel blocks located within the current row within the current video frame, so that the motion match is performed by using the weighted prediction mode.

With reference to the second possible implementation manner of the first aspect, in a third possible implementation manner, R is calculated according to the following relation:

$$R=L*(width-D0)$$

where L is the acquired current row and total L surrounding rows within the current video frame, width is a quantity of blocks in one row of a frame picture, and D0 is an error value of a quantity of blocks, in one row, having a letter box.

With reference to the second possible implementation manner of the first aspect, in a fourth possible implementation manner, if it is detected that no fade-in/fade-out exists, the acquiring pixel luminance information within a preset area of a current video frame further includes acquiring, within the range of the detected current row and total L surrounding rows within the current frame, the pixel luminance information within a rectangular area whose center is a current block and that has a predetermined size. The calculating, on a block basis according to the acquired pixel luminance information within the preset area of the current video frame, a direct current component of a unit pixel block located within the preset area of the current video frame, to acquire the block direct current component of the unit pixel block includes calculating, on a block basis according to the acquired pixel luminance information that is acquired within the range of the detected current row and total L surrounding rows within the current frame and that is within the rectangular area whose center is the current block and that has the predetermined size, a direct current component of a unit pixel block located within the rectangular area whose center is the current block and that has the predetermined size, to acquire the block direct current component of the unit pixel block. The acquiring pixel luminance information of a reference pixel block, in a reference frame corresponding to the current video frame, corresponding to the unit pixel block located within the preset area of the current video frame includes acquiring pixel luminance information of a reference pixel block, in the reference frame corresponding to the current video frame, corresponding to the unit pixel block located within the rectangular area whose center is the current block and that has the predetermined size. The comparing the acquired block direct current component of the unit pixel block located within the preset area of the current video frame with the direct current component, of the reference pixel block in the reference frame, corresponding to the direct current component of the unit pixel block located within the preset area of the current video frame includes comparing the acquired block direct current component of the unit pixel block located within the rectangular area whose center is the current block and that has the predetermined size with the direct current component, of the reference pixel block in the reference frame, corresponding to the direct current component of the unit pixel block located within the rectangular area whose center is the current block and that has the predetermined size. The marking, when it is detected that fade-in/fade-out exists, a current to-be-processed object, so that motion match is performed by using a weighted prediction mode includes marking a current unit pixel block located within the current video frame, so that the motion match is performed by using the weighted prediction mode.

With reference to the first aspect or the first possible implementation manner of the first aspect, in a fifth possible implementation manner, the acquiring pixel luminance information within a preset area of a current video frame further includes acquiring the pixel luminance information within a rectangular area whose center is a current block, that has a predetermined size, and that is set within the current video frame. The calculating, on a block basis according to the acquired pixel luminance information within the preset area of the current video frame, a direct current component of a unit pixel block located within the preset area of the current video frame, to acquire the block direct current component of the unit pixel block further includes calculating, on a block basis according to the pixel luminance information within the rectangular area whose center is the current block, that has the predetermined size, and that is set within the current video frame, a direct current component of a unit pixel block located within the rectangular area whose center is the current block, that has the predetermined size, and that is set within the current video frame, to acquire the block direct current component of the unit pixel block; the acquiring pixel luminance information of a reference pixel block, in a reference frame corresponding to the current video frame, corresponding to the unit pixel block located within the preset area of the current video frame includes acquiring pixel luminance information of a reference pixel block, in the reference frame corresponding to the current video frame, corresponding to the unit pixel block located within the rectangular area whose center is the current block, that has the predetermined size, and that is set within the current video frame. The comparing the acquired block direct current component of the unit pixel block located within the preset area of the current video frame with the direct current component, of the reference pixel block in the reference frame, corresponding to the direct current component of the unit pixel block located within the preset area of the current video frame includes comparing the acquired block direct current component of the unit pixel block located within the rectangular area whose center is the current block, that has the predetermined size, and that is set within the current video frame with the direct current component, of the reference pixel block in the reference frame, corresponding to the direct current component of the unit pixel block located within the rectangular area whose center is the current block, that has the predetermined size, and that is set within the current video frame. The marking, when it is detected that fade-in/fade-out exists, a current to-be-processed object, so that motion match is performed by using a weighted prediction mode includes marking a current unit pixel block located within the current video frame, so that the motion match is performed by using the weighted prediction mode.

With reference to the fifth possible implementation manner of the first aspect, in a sixth possible implementation manner, R is calculated according to the following relation:

R=blkNums−D1;

where blkNums is a quantity of blocks within the rectangular area whose center is the current block, that has the predetermined size, and that is set within the current video frame, and D1 is an allowed error quantity of blocks.

According to a second aspect, a video frame fade-in/fade-out detection apparatus is provided, including a first acquiring unit, configured to acquire pixel luminance information within a preset area of a current video frame. Also included is a first calculation unit, configured to calculate, on a block basis according to the acquired pixel luminance information within the preset area of the current video frame, a direct current component of a unit pixel block located within the preset area of the current video frame, to acquire the block direct current component of the unit pixel block. Also included is a second acquiring unit, configured to acquire pixel luminance information of a reference pixel block, in a reference frame corresponding to the current video frame, corresponding to the unit pixel block located within the preset area of the current video frame. Also included is a second calculation unit, configured to calculate a block direct current component of the reference pixel block according to the pixel luminance information of the reference pixel block. Also included is a first comparison unit, configured to compare the acquired block direct current component of the unit pixel block located within the preset area of the current video frame with the direct current component, of the reference pixel block in the reference frame, corresponding to the direct current component of the unit pixel block located within the preset area of the current video frame. Also included is a first determining unit, configured to collect statistics on a comparison result of the direct current components, and determine, according to a statistics collection result, whether fade-in/fade-out exists. Also included is a first processing unit, configured to, when it is detected that fade-in/fade-out exists, mark a current to-be-processed object, so that motion match is performed by using a weighted prediction mode.

With reference to the second aspect, in a first possible implementation manner of the second aspect, the first comparison unit is specifically configured to compare the block direct current component $DC0_{ij}$ of the unit pixel located within the preset area of the current video frame with the direct current component $DC1_{ij}$, of the reference pixel block in the reference frame, corresponding to the direct current component of the unit pixel block located within the preset area of the current video frame, to obtain $fFlag_{ij}$, where $fFlag_{ij}$ is obtained according to the following relation:

$$fFlag_{ij} = \begin{cases} 1 & DC0_{ij} < DC1_{ij} \\ 0 & DC0_{ij} > DC1_{ij} \end{cases}$$

Correspondingly, the first determining unit is specifically configured to separately collect, according to the following formulas, statistics on a quantity $fiNum_g$ of unit pixels within the preset area of the current video frame and satisfying that the block direct current component $DC0_{ij}$ is less than the direct current component $DC1_{ij}$, of the reference pixel block in the reference frame, corresponding to the direct current component of the unit pixel block located within the preset area of the current video frame, and a quantity $foNum_g$ of unit pixels within the preset area of the current video frame and satisfying that the block direct current component $DC0_{ij}$ is greater than the direct current component $DC1_{ij}$, of the reference pixel block in the reference frame, corresponding to the direct current component of the unit pixel block located within the preset area of the current video frame:

$fiNum_g = \Sigma fFlag_{ij}$; and $foNum_g = \Sigma(1-fFlag_{ij})$; and if $fiNum_g > R$ or $foNum_g > R$, determine that fade-in/fade-out exists in the unit pixel block within the preset area of the current video frame, where R is a preset threshold for determining fade-in/fade-out.

With reference to the second aspect or the first possible implementation manner of the second aspect, in a second possible implementation manner, the first acquiring unit includes a first acquiring subunit, and the first acquiring subunit is configured to acquire the pixel luminance information within a range of a current row and total L surrounding rows within the current video frame. Correspondingly, the first calculation unit is further configured to calculate, on a block basis according to the pixel luminance information within the range of the current row and the total L surrounding rows within the current video frame, a direct current component of a unit pixel block located within the range of the current row and the total L surrounding rows within the current video frame, to acquire the block direct current component of the unit pixel block. The second acquiring unit is further configured to acquire pixel luminance information of a reference pixel block, in the reference frame corresponding to the current video frame, corresponding to the unit pixel block located within the range of the current row and the total L surrounding rows within the current video frame. The first comparison unit is further configured to: compare the acquired block direct current component of the unit pixel block located within the range of the current row and the total L surrounding rows within the current video frame with the direct current component, of the reference pixel block in the reference frame, corresponding to the direct current component of the unit pixel block located within the range of the current row and the total L surrounding rows within the current video frame. The first processing unit is further configured to mark all unit pixel blocks located within the current row within the current video frame, so that the motion match is performed by using the weighted prediction mode.

With reference to the second possible implementation manner of the second aspect, in a third possible implementation manner, R is calculated by using the following formula:

$$R = L*(\text{width} - D0),$$

where L is the acquired current row and total L surrounding rows within the current video frame, width is a quantity of blocks in one row of a frame picture, and $D0$ is an error value of a quantity of blocks, in one row, having a letter box.

With reference to the second possible implementation manner of the second aspect, in a fourth possible implementation manner, if the first determining unit detects that no fade-in /fade-out exists, the first acquiring unit further includes a second acquiring subunit, and the second acquiring subunit is configured to acquire, within the range of the detected current row and total L surrounding rows within the current frame, the pixel luminance information within a rectangular area whose center is a current block and that has a predetermined size. Correspondingly, the first calculation unit is further configured to calculate, on a block basis according to the acquired pixel luminance information that is acquired within the range of the detected current row and total L surrounding rows within the current frame and that is within the rectangular area whose center is the current block and that has the predetermined size, a direct current component of a unit pixel block located within the rectangular area whose center is the current block and that has the predetermined size, to acquire the block direct current component of the unit pixel block. The second acquiring unit is further configured to: acquire pixel luminance information of a reference pixel block, in the reference frame corresponding to the current video frame, corresponding to the unit pixel block located within the rectangular area whose center is the current block and that has the predetermined size. The first comparison unit is further configured to compare the acquired block direct current component of the unit pixel block located within the rectangular area whose center is the current block and that has the predetermined size with the direct current component, of the reference pixel block in the reference frame, corresponding to the direct current component of the unit pixel block located within the rectangular area whose center is the current block and that has the predetermined size; and the first processing unit is further configured to mark a current unit pixel block located within the current video frame, so that the motion match is performed by using the weighted prediction mode.

With reference to the second aspect or the first possible implementation manner of the second aspect, in a fifth possible implementation manner, the first acquiring unit is further configured to acquire the pixel luminance information within a rectangular area whose center is a current block, that has a predetermined size, and that is set within the current video frame. Correspondingly, the first calculation unit is further configured to calculate, on a block basis according to the pixel luminance information within the rectangular area whose center is the current block, that has the predetermined size, and that is set within the current video frame, a direct current component of a unit pixel block located within the rectangular area whose center is the current block, that has the predetermined size, and that is set within the current video frame, to acquire the block direct current component of the unit pixel block. The second acquiring unit is further configured to acquire pixel luminance information of a reference pixel block, in the reference frame corresponding to the current video frame, corresponding to the unit pixel block located within the rectangular area whose center is the current block, that has the predetermined size, and that is set within the current video frame. The first comparison unit is further configured to compare the acquired block direct current component of the unit pixel block located within the rectangular area whose center is the current block, that has the predetermined size, and that is set within the current video frame with the direct current component, of the reference pixel block in the reference frame, corresponding to the direct current component of the unit pixel block located within the rectangular area whose center is the current block, that has the predetermined size, and that is set within the current video frame. The first processing unit is further configured to mark a current unit pixel block located within the current video frame, so that the motion match is performed by using the weighted prediction mode.

With reference to the fifth possible implementation manner of the second aspect, in a sixth possible implementation manner, R is calculated according to the following relation:

$$R = \text{blkNums} - D1,$$

where blkNums is a quantity of blocks within the rectangular area whose center is the current block, hat has the predetermined size, and that is set within the acquired current video frame, and $D1$ is an allowed error quantity of blocks.

Beneficial effects are as follows. In the video frame fade-in/fade-out detection method and apparatus provided, pixel luminance information within a preset area of a current video frame is acquired, and meanwhile, a direct current component of a unit pixel block is calculated according to the acquired pixel luminance information. Moreover, once a block is acquired, the block is detected, and processing is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time. Therefore, this synchronous running mode enables the method to save a sum of bandwidths resulting from hardware implementation and motion estimation. Finally, because fade-in/fade-out is detected in time and processing is performed in time, motion estimation match accuracy is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Embodiment 1

Figure 1:
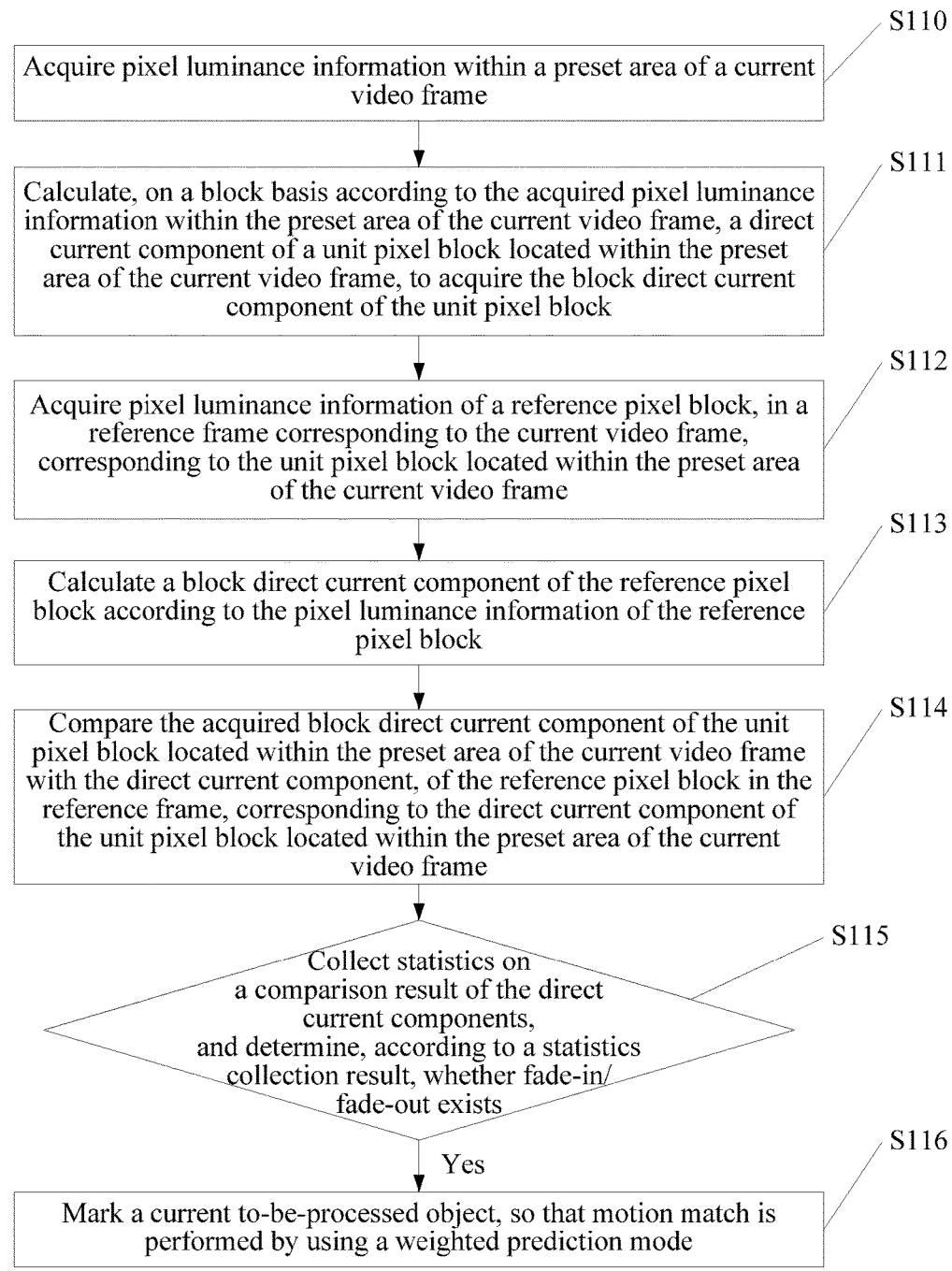
FIG. 1 is a schematic flowchart of a video frame fade-in/fade-out detection method according to an embodiment.

This embodiment provides a video frame fade-in/fade-out detection method 100. Referring to FIG. 1, the method specifically includes the following steps.

S110: Acquire pixel luminance information within a preset area of a current video frame.

S111: Calculate, on a block basis according to the acquired pixel luminance information within the preset area of the current video frame, a direct current component of a unit pixel block located within the preset area of the current video frame, to acquire the block direct current component of the unit pixel block.

S112: Acquire pixel luminance information of a reference pixel block, in a reference frame corresponding to the current video frame, corresponding to the unit pixel block located within the preset area of the current video frame.

S113: Calculate a block direct current component of the reference pixel block according to the pixel luminance information of the reference pixel block.

S114: Compare the acquired block direct current component of the unit pixel block located within the preset area of the current video frame with the direct current component, of the reference pixel block in the reference frame, corresponding to the direct current component of the unit pixel block located within the preset area of the current video frame.

S115: Collect statistics on a comparison result of the direct current components, and determine, according to a statistics collection result, whether fade-in/fade-out exists.

S116: When it is detected that fade-in/fade-out exists, mark a current to-be-processed object, so that motion match is performed by using a weighted prediction mode.

In the video frame fade-in/fade-out detection method 100 provided in this embodiment, pixel luminance information within a preset area of a current video frame is acquired, and meanwhile, a direct current component of a unit pixel block is calculated according to the acquired pixel luminance information. Moreover, once a block is acquired, the block is detected, and processing is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time. Therefore, this synchronous running mode enables the method to save a sum of bandwidths resulting from hardware implementation and motion estimation. Finally, because fade-in/fade-out is detected in time and processing is performed in time, motion estimation match accuracy is improved. Therefore, the method provided in this embodiment achieves beneficial effects of avoiding a delay, saving a bandwidth, and improving motion estimation match accuracy.

Embodiment 2

Figure 2A:
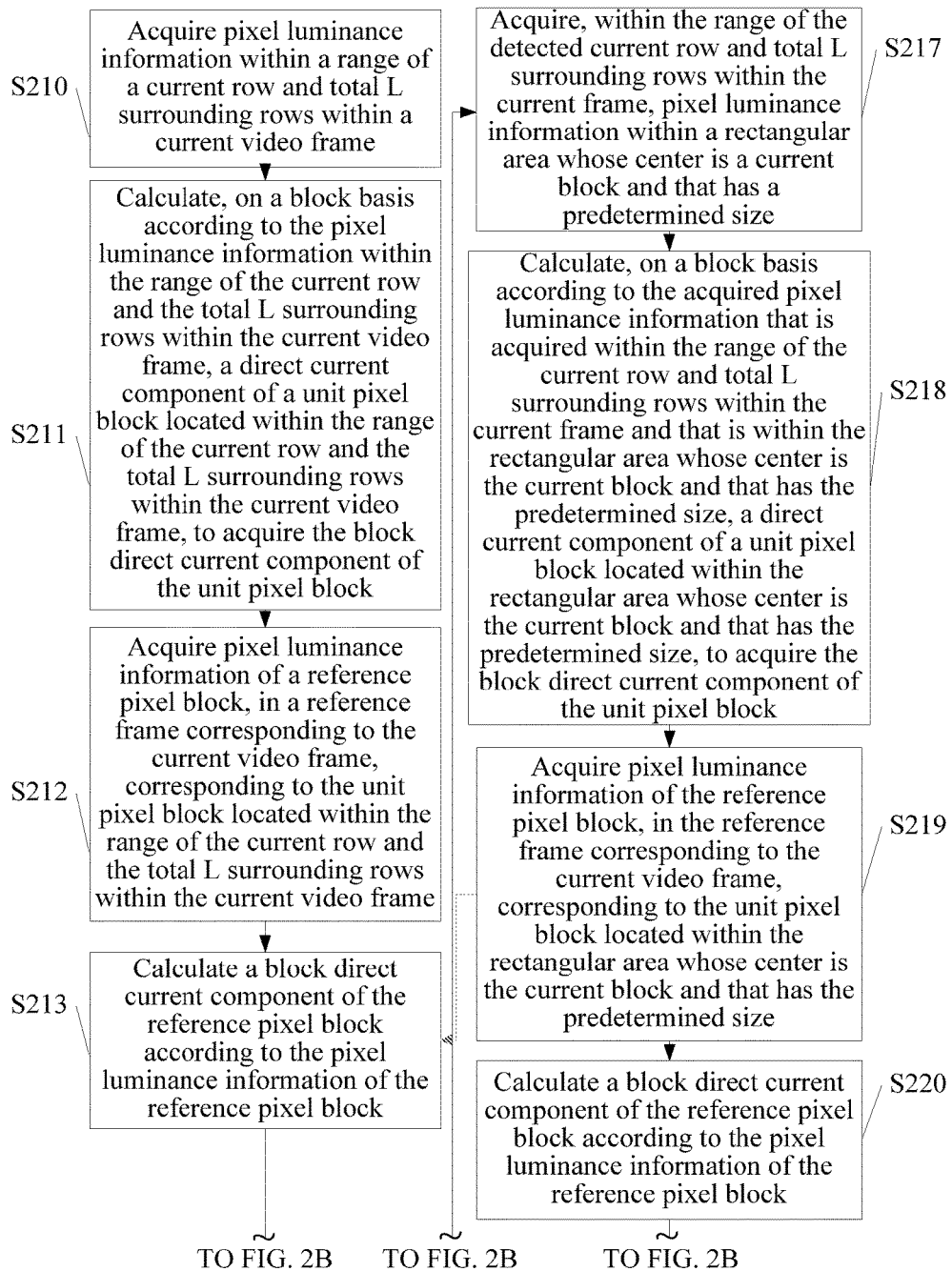
FIG. 2A and FIG. 2B are a schematic flowchart of another video frame fade-in/fade-out detection method according to an embodiment.
Figure 2B:
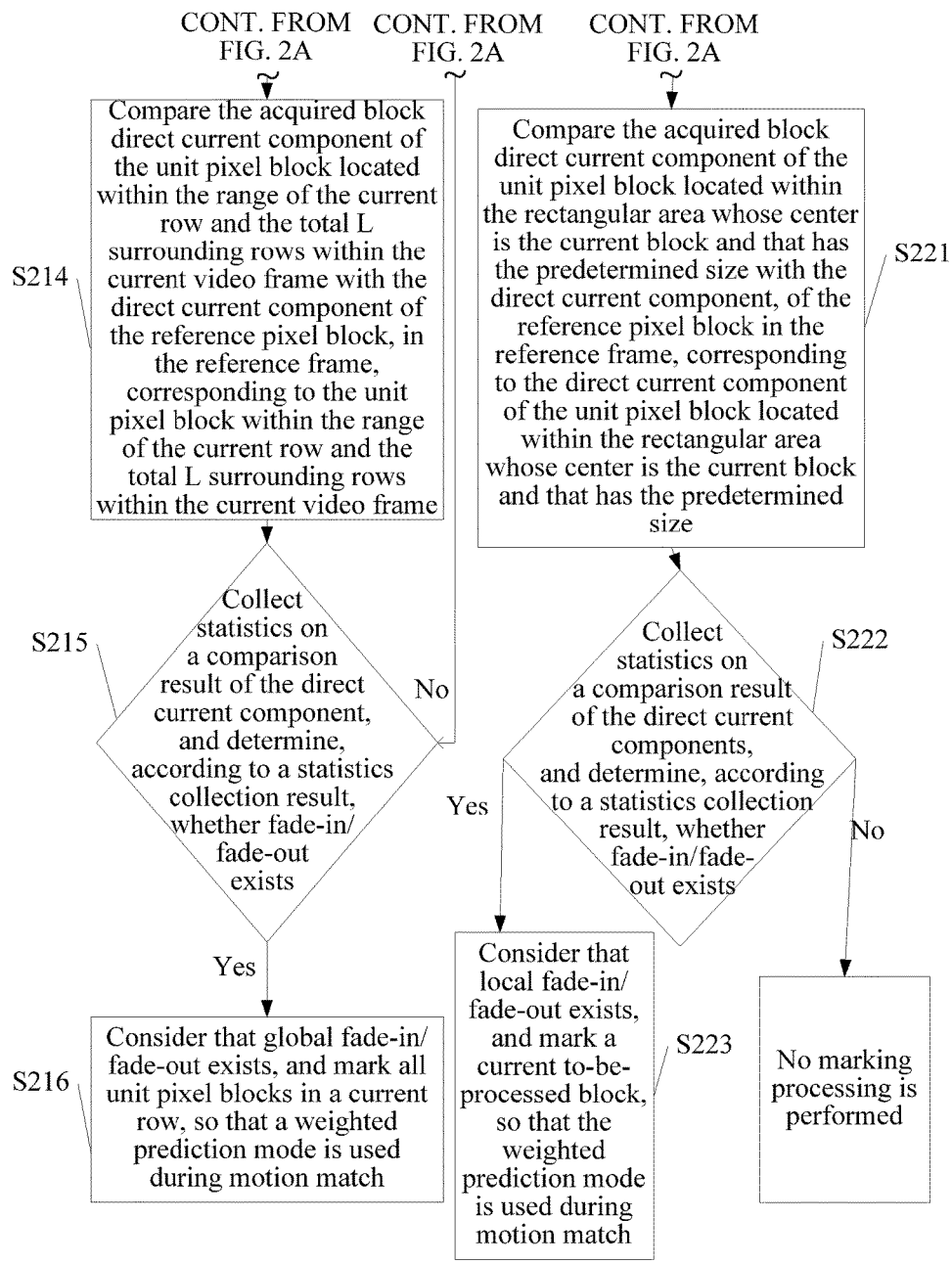

This embodiment provides another video frame fade-in/fade-out detection method 200. Referring to FIG. 2A and FIG. 2B, specifically, step S110 in implementation manner 1 of the present invention specifically includes the following steps.

S210: Acquire pixel luminance information within a range of a current row and total L surrounding rows within a current video frame.

S211: Calculate, on a block basis according to the pixel luminance information within the range of the current row and the total L surrounding rows within the current video frame, a direct current component of a unit pixel block located within the range of the current row and the total L surrounding rows within the current video frame, to acquire the block direct current component of the unit pixel block.

Specifically, step S210 of acquiring pixel luminance information may specifically include the following steps: setting a size of a search window to H*M, and a size of a block to N*N; and based on the block with the size of N*N, loading pixel luminance information of the first N rows of the current frame, where a video format is generally YUV, and in this case, a loaded pixel component is luminance information Y.

Specifically, step S211 of calculating a block direct current component may specifically include the following steps: calculating an average value of pixel luminance information Y of each macroblock that is obtained by dividing the loaded rows according to the size of N*N, and using the average value as a direct current component $DC0_0$ of the macroblock, that is:

$$\frac{1}{N^2}\sum_{i,j}Y_{ij};$$

and
loading pixel luminance information of the second N rows, and calculating a block direct current component $DC0_1$; loading pixel luminance information of the third N rows, and calculating a block direct current component $DC0_2$; and loading pixel luminance information of the $L^{th}$ N rows, and calculating a block direct current component $DC0_L$.

S212: Acquire pixel luminance information of a reference pixel block, in a reference frame corresponding to the current video frame, corresponding to the unit pixel block located within the range of the current row and the total L surrounding rows within the current video frame.

S213: Calculate a block direct current component of the reference pixel block according to the pixel luminance information of the reference pixel block.

Specifically, specific steps of step S212 are the same as those of S210 of acquiring pixel luminance information.

Specifically, specific steps of step S213 are the same as those of S211 of calculating a block direct current component.

S214: Compare the acquired block direct current component of the unit pixel block located within the range of the current row and the total L surrounding rows within the current video frame with the direct current component of the reference pixel block, in the reference frame, corresponding to the unit pixel block within the range of the current row and the total L surrounding rows within the current video frame.

Specifically, step S214 of comparing the block direct current components includes the following steps: determining a range within the L rows according to a current macroblock and based on a width of a picture and a height of the search window; comparing a direct current component $DC0_{ij}$ of a current block of the current frame with a direct current component $DC1_{ij}$ of a block at a corresponding location of the reference frame, to obtain $fFlag_{ij}$, where $fFlag_{ij}$ is obtained according to the following relation:

$$fFlag_{ij} = \begin{cases} 1 & DC0_{ij} < DC1_{ij} \\ 0 & DC0_{ij} > DC1_{ij} \end{cases}.$$

S215: Collect statistics on a comparison result of the direct current components, and determine, according to a statistics collection result, whether fade-in/fade-out exists, which specifically includes the following steps.

Specifically, step S215 of determining whether fade-in/fade-out exists includes the following steps: collecting statistics on the comparison result of the direct current components, collecting statistics on a quantity $fiNum_g$ of current blocks, of the current frame, satisfying that a direct current component $DC0_{ij}$ is less than a direct current component $DC1_{ij}$ of a block at a corresponding location of the reference frame, and similarly collecting statistics on a quantity $foNum_g$ of current blocks, of the current frame, satisfying that a direct current component $DC0_{ij}$ is greater than a direct current component $DC1_{ij}$ of a block at a corresponding location of the reference frame, where $fiNum_g = \Sigma fFlag_{ij}$; and $foNum_g = \Sigma(1-fFlag_{ij})$; and if $fiNum_g > R$ or $foNum_g > R$, considering that fade-in/fade-out exists in a current row, determining that the fade-in/fade-out is global fade-in/fade-out, and performing step 216; or if $fiNum_g \leq R$ and $foNum_g \leq R$, considering that no global fade-in/fade-out exists in a current row, and performing step S217, where $R = L*(width-D0)$, L is the acquired current row and total L surrounding rows within the current video frame, width is a quantity of blocks in one row of a frame picture, and D0 is an error value of a quantity of blocks, in one row, having a letter box.

S216: When it is detected that fade-in/fade-out exists in a current row, consider that global fade-in/fade-out exists, and mark all unit pixel blocks in the current row, so that a weighted prediction mode is used during motion match.

S217: When it is detected that no global fade-in/fade-out exists, acquire, within the range of the detected current row and total L surrounding rows within the current frame, the pixel luminance information within a rectangular area whose center is a current block and that has a predetermined size.

Specifically, specific steps of step S217 of acquiring pixel luminance information are the same as those of S210.

S218: Calculate, on a block basis according to the acquired pixel luminance information that is acquired within the range of the current row and total L surrounding rows within the current frame and that is within the rectangular area whose center is the current block and that has the predetermined size, a direct current component of a unit pixel block located within the rectangular area whose center is the current block and that has the predetermined size, to acquire the block direct current component of the unit pixel block.

Specifically, specific steps of step S218 of calculating a block direct current component are the same as those of S211.

S219: Acquire pixel luminance information of a reference pixel block, in the reference frame corresponding to the current video frame, corresponding to the unit pixel block located within the rectangular area whose center is the current block and that has the predetermined size.

Specifically, specific steps of step S219 of acquiring pixel luminance information are the same as those of S210.

S220: Calculate a block direct current component of the reference pixel block according to the pixel luminance information of the reference pixel block.

Specifically, specific steps of step S220 of calculating a block direct current component are the same as those of S211.

S221: Compare the acquired block direct current component of the unit pixel block located within the rectangular area whose center is the current block and that has the predetermined size with the direct current component, of the reference pixel block in the reference frame, corresponding to the direct current component of the unit pixel block located within the rectangular area whose center is the current block and that has the predetermined size.

Specifically, specific steps of step S221 of comparing the block direct current components include: determining a range within the L rows according to a current macroblock and based on a width of a picture and a height of the search window; comparing a direct current component $DC0_{ij}$ of the current block of the current frame with a direct current component $DC1_{ij}$ of a block at a corresponding location of the reference frame, to obtain $fFlag_{ij}$, where $fFlag_{ij}$ is obtained according to the following relation:

$$fFlag_{ij} = \begin{cases} 1 & DC0_{ij} < DC1_{ij} \\ 0 & DC0_{ij} > DC1_{ij} \end{cases}.$$

S222: Collect statistics on a comparison result of the direct current components, and determine, according to a statistics collection result, whether fade-in/fade-out exists.

Specifically, specific steps of step S222 of collecting statistics on the comparison result of the block direct current components include: collecting statistics on the comparison result of the direct current components, collecting statistics on a quantity fiNum$_g$ of current blocks, of the current frame, satisfying that a direct current component $DC0_{ij}$ is less than a direct current component $DC1_{ij}$ of a block at a corresponding location of the reference frame, and collecting statistics on a quantity foNum$_g$ of current blocks, of the current frame, satisfying that a direct current component $DC0_{ij}$ is greater than a direct current component $DC1_{ij}$ of a block at a corresponding location of the reference frame, where fiNum$_g$=ΣfFlag$_{ij}$; and foNum$_g$=Σ(1−fFlag$_{ij}$); and if fiNum$_g$>R or foNum$_g$>R, considering that fade-in/fade-out exists in a current to-be-processed block, determining that the fade-in/fade-out is local fade-in/fade-out, and performing step 223, where a size of a local area is P*Q, P and Q are natural numbers greater than 1, and Q is less than the height of the search window, and ensures that the local area is within the picture; and R=blkNums−D1, where blkNum: is a quantity of macroblocks within the local area, and D1 is an allowed error quantity of blocks.

S223: Mark a current to-be-processed block, so that the weighted prediction mode is used during motion match.

In the video frame fade-in/fade-out detection method 200 provided in this embodiment of the present invention, pixel luminance information within a range of a current row and total L surrounding rows within a current video frame is acquired, and meanwhile, a direct current component of a unit pixel block is calculated according to the acquired pixel luminance information. Moreover, once a block is acquired, the block is detected, and processing on a current to-be-processed row is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. In a case in which it is detected that no fade-in/fade-out exists in the current row, the pixel luminance information within a rectangular area whose center is a current block and that has a predetermined size is further acquired within the range of the detected current row and total L surrounding rows within the current frame, and a direct current component of a unit pixel block is synchronously calculated according to the acquired pixel luminance information. Moreover, once a block is acquired, the block is detected, and processing on a current to-be-processed block is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. Therefore, the method provided in this embodiment achieves beneficial effects of avoiding a delay, saving a bandwidth, and improving motion estimation match accuracy. Moreover, fade-in/fade-out detection is first performed on the current to-be-processed row of some rows, and block fade-in/fade-out detection is further performed, in the rectangular area whose center is the current block, that has the predetermined size, and that is within the rows, on the current to-be-processed block. The method further reduces a detection amount, thereby performing processing more quickly, further avoiding a delay and saving a bandwidth, and further improving motion estimation match accuracy.

Embodiment 3

Figure 3:
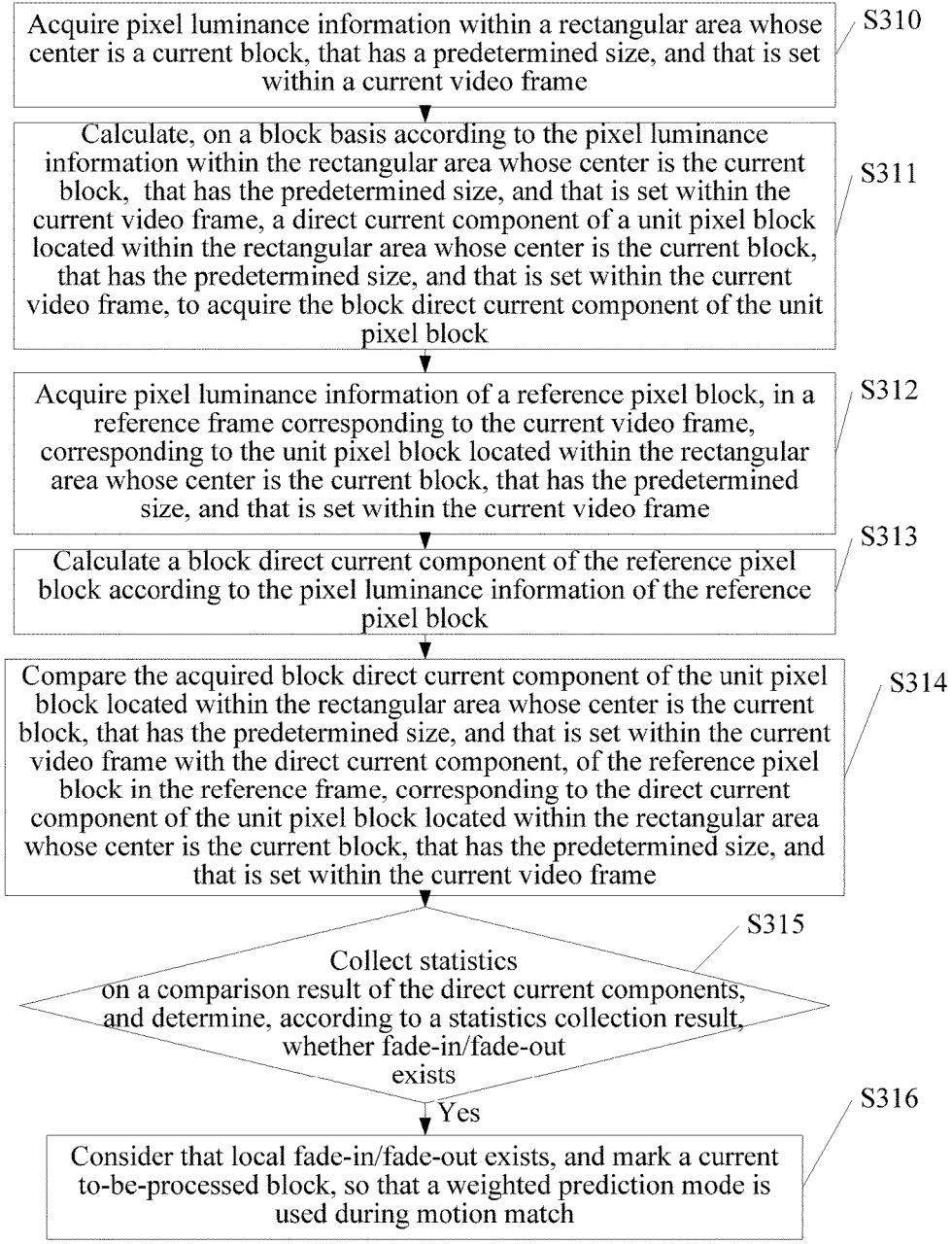
FIG. 3 is a schematic flowchart of still another video frame fade-in/fade-out detection method according to an embodiment.

This embodiment provides still another video frame fade-in/fade-out detection method 300. Referring to FIG. 3, specifically, step S110 in implementation manner 1 of the present invention specifically includes the following steps.

S310: Acquire pixel luminance information within a rectangular area whose center is a current block, that has a predetermined size, and that is set within a current video frame.

S311: Calculate, on a block basis according to the pixel luminance information within the rectangular area whose center is the current block, that has the predetermined size, and that is set within the current video frame, a direct current component of a unit pixel block located within the rectangular area whose center is the current block, that has the predetermined size, and that is set within the current video frame, to acquire the block direct current component of the unit pixel block.

Specifically, step S310 of acquiring pixel luminance information may specifically include the following steps: setting a size of a search window to H*M, and a size of a block to N*N; and based on the block with the size of N*N, loading pixel luminance information of the first N rows of the current frame, where a video format is generally YUV, and in this case, a loaded pixel component is luminance information Y.

Specifically, step S311 of calculating a block direct current component may specifically include the following steps: calculating an average value of pixel luminance information Y of each macroblock that is obtained by dividing the loaded rows according to the size of N*N, and using the average value as a direct current component $DC0_0$ of the macroblock, that is, $$\frac{1}{N^2}\sum_{i,j} Y_{ij};$$

and
loading pixel luminance information of the second N rows, and calculating a block direct current component $DC0_1$; loading pixel luminance information of the third N rows, and calculating a block direct current component $DC0_2$; and loading pixel luminance information of the $L^{th}$ N rows, and calculating a block direct current component $DC0_L$.

S312: Acquire pixel luminance information of a reference pixel block, in a reference frame corresponding to the current video frame, corresponding to the unit pixel block located within the rectangular area whose center is the current block, that has the predetermined size, and that is set within the current video frame.

S313: Calculate a block direct current component of the reference pixel block according to the pixel luminance information of the reference pixel block.

Specifically, specific steps of step S312 are the same as those of S310 of acquiring pixel luminance information.

Specifically, specific steps of step S313 are the same as those of S311 of calculating a block direct current component.

S314: Compare the acquired block direct current component of the unit pixel block located within the rectangular area whose center is the current block, that has the predetermined size, and that is set within the current video frame with the direct current component, of the reference pixel block in the reference frame, corresponding to the direct current component of the unit pixel block located within the rectangular area whose center is the current block, that has the predetermined size, and that is set within the current video frame.

Specifically, step S314 includes the following steps: determining a range of a rectangular area of a size according to a current macroblock and based on a width of a picture and a height of the search window; comparing a direct current component $DC0_{ij}$ of the current block of the current frame with a direct current component $DC1_{ij}$ of a block that is at a corresponding location of the reference frame and that is pointed at by a time-domain motion vector of the current block (if the location of the corresponding block, which is pointed at, of the reference frame exceeds the search window, a block, closest to the corresponding block, within the search window is acquired), to obtain $fFlag_{ij}$, where $fFlag_{ij}$ is obtained by using the following equation:

$$fFlag_{ij} = \begin{cases} 1 & DC0_{ij} < DC1_{ij} \\ 0 & DC0_{ij} > DC1_{ij} \end{cases}.$$

S315: Collect statistics on a comparison result of the direct current components, and determine, according to a statistics collection result, whether fade-in/fade-out exists, which specifically includes the following steps:

Specifically, step S315 includes the following steps: collecting statistics on the comparison result of the direct current components, collecting statistics on a quantity $fiNum_g$ of macroblocks that are among all macroblocks within a local area whose center is a current block of the current frame and that satisfy that a direct current component $DC0_{ij}$ is less than direct current components $DC1_{ij}$ of all macroblocks within a local area whose center is a block at a specified location of the reference frame, and similarly collecting statistics on a quantity $foNum_g$ of macroblocks that are among all macroblocks within a local area whose center is a current block of the current frame and that satisfy that a direct current component $DC0_{ij}$ is greater than direct current components $DC1_{ij}$ of all macroblocks within a local area whose center is a block at a specified location of the reference frame, where $fiNum_g = \Sigma fFlag_{ij}$; and $foNum_g = \Sigma (1 - fFlag_{ij})$; and if $fiNum_g > R$ or $foNum_g > R$, considering that fade-in/fade-out exists in a current to-be-processed block, determining that the fade-in/fade-out is local fade-in/fade-out, and performing step 316, where a size of a local area is P×Q, P and Q are natural numbers greater than 1, and Q is less than the height of the search window, and ensures that the local area is within the picture; and R=blkNums−D1, where blkNums is a quantity of macroblocks within the local area, and D1 is an allowed error quantity of blocks.

S316: Mark a current to-be-processed block, so that a weighted prediction mode is used during motion match.

In the video frame fade-in/fade-out detection method 300 provided in this embodiment of the present invention, pixel luminance information within a rectangular area whose center is a current block, that has a predetermined size, and that is set within a current video frame is acquired, and meanwhile, a direct current component of a unit pixel block is calculated according to the acquired pixel luminance information. Moreover, once a block is acquired, the block is detected, and processing on a current to-be-processed block is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. Therefore, the method provided in this embodiment achieves beneficial effects of avoiding a delay, saving a bandwidth, and improving motion estimation match accuracy.

Embodiment 4

Figure 4:
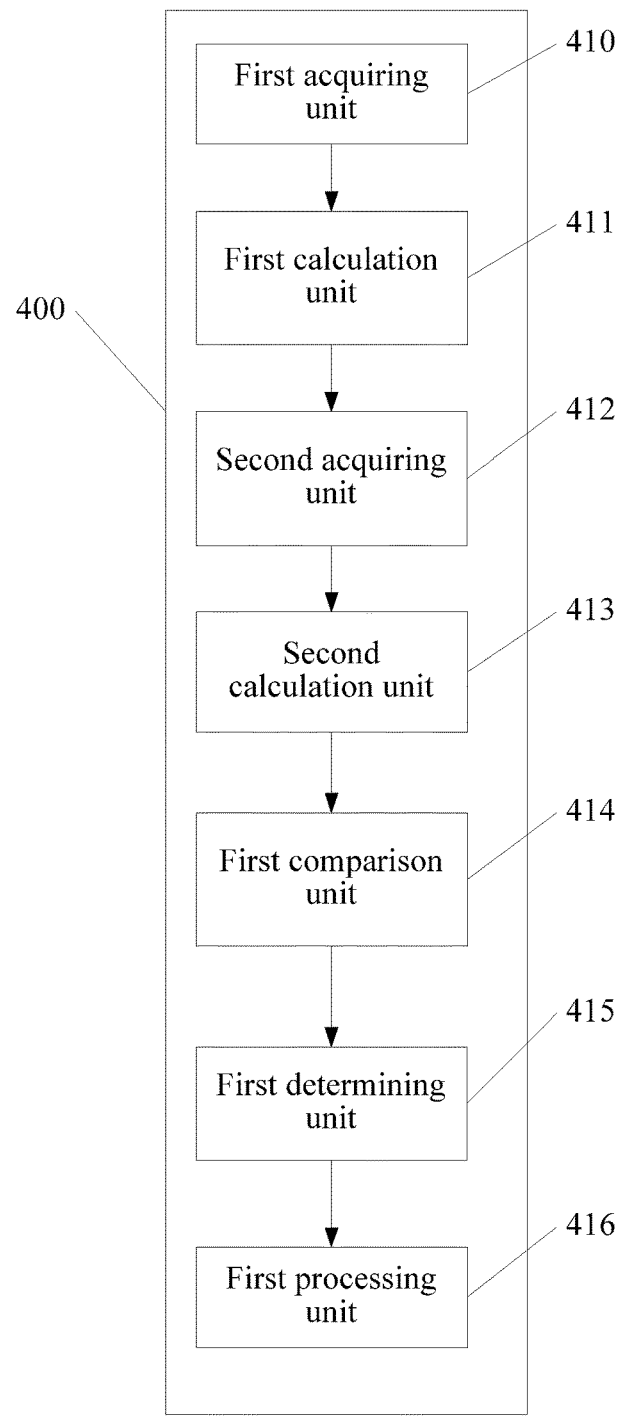
FIG. 4 is a schematic diagram of a video frame fade-in/fade-out detection apparatus according to an embodiment.

This embodiment further provides a video frame fade-in/fade-out detection apparatus 400. Referring to FIG. 4, the apparatus specifically includes a first acquiring unit 410, configured to acquire pixel luminance information within a preset area of a current video frame. Also included is a first calculation unit 411, configured to calculate, on a block basis according to the acquired pixel luminance information within the preset area of the current video frame, a direct current component of a unit pixel block located within the preset area of the current video frame, to acquire the block direct current component of the unit pixel block. Also included is a second acquiring unit 412, configured to acquire pixel luminance information of a reference pixel block, in a reference frame corresponding to the current video frame, corresponding to the unit pixel block located within the preset area of the current video frame. Also included is a second calculation unit 413, configured to calculate a block direct current component of the reference pixel block according to the pixel luminance information of the reference pixel block. Also included is a first comparison unit 414, configured to compare the acquired block direct current component of the unit pixel block located within the preset area of the current video frame with the direct current component, of the reference pixel block in the reference frame, corresponding to the direct current component of the unit pixel block located within the preset area of the current video frame. Also included is a first determining unit 415, configured to collect statistics on a comparison result of the direct current components, and determine, according to a statistics collection result, whether fade-in/fade-out exists. Also included is a first processing unit 416, configured to, when it is detected that fade-in/fade-out exists, mark a current to-be-processed object, so that motion match is performed by using a weighted prediction mode.

In the video frame fade-in/fade-out detection apparatus 400 provided in this embodiment, pixel luminance information within a preset area of a current video frame is acquired, and meanwhile, a direct current component of a unit pixel block is calculated according to the acquired pixel luminance information. Moreover, once a block is acquired, the block is detected, and processing is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. Therefore, the method provided in this embodiment achieves beneficial effects of avoiding a delay, saving a bandwidth, and improving motion estimation match accuracy.

Embodiment 5

Figure 5A:
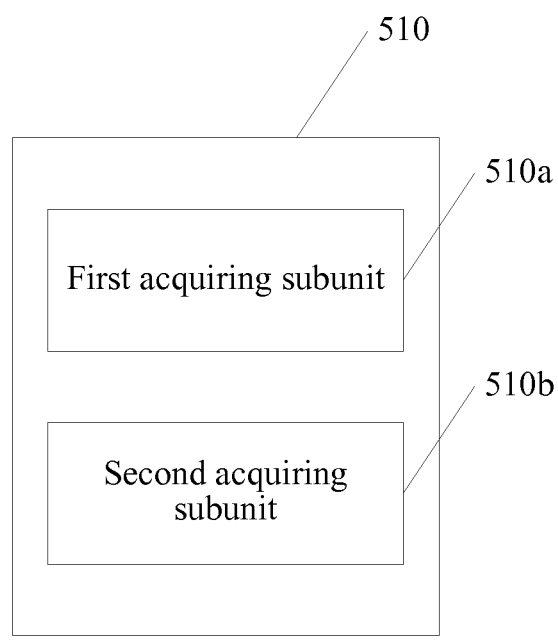
FIG. 5a is a block diagram of a first acquiring unit in another video frame fade-in/fade-out detection apparatus according to an embodiment.
Figure 5B:
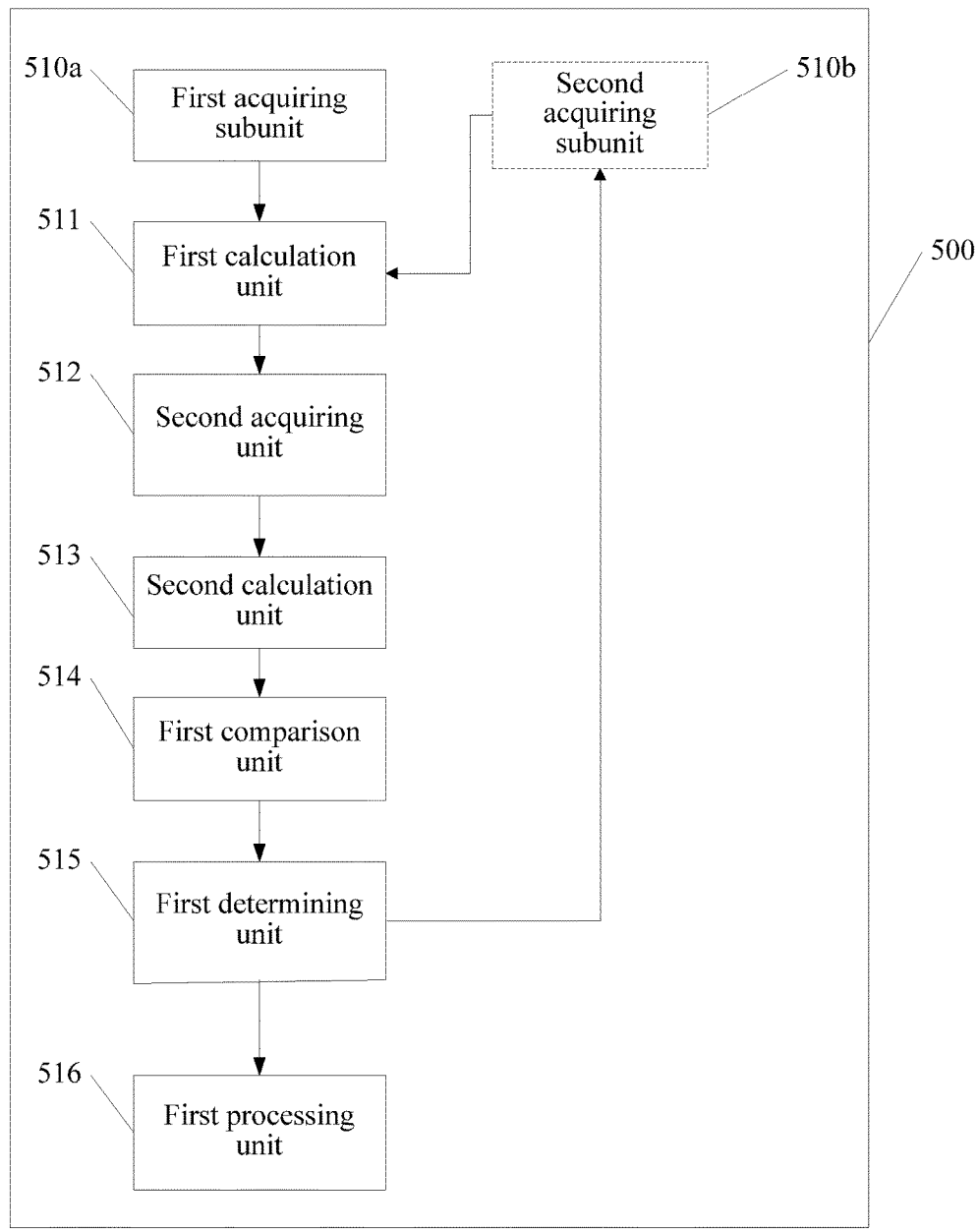
FIG. 5b is a schematic diagram of another video frame fade-in/fade-out detection apparatus according to an embodiment.

This embodiment provides another video frame fade-in/fade-out detection apparatus 500. Referring to FIG. 5a and FIG. 5b, specifically, a first acquiring unit 510 includes a first acquiring subunit 510a and a second acquiring subunit 510b.

The first acquiring subunit 510a is configured to acquire pixel luminance information within a range of a current row and total L surrounding rows within a current video frame.

Correspondingly, a first calculation unit 511 is configured to calculate, on a block basis according to the pixel luminance information within the range of the current row and the total L surrounding rows within the current video frame, a direct current component of a unit pixel block located within the range of the current row and the total L surrounding rows within the current video frame, to acquire the block direct current component of the unit pixel block.

Specifically, the acquiring pixel luminance information by the first acquiring subunit 510a is specifically: setting a size of a search window to H*M, and a size of a block to N*N; and based on the block with the size of N*N, loading pixel luminance information of the first N rows of the current frame, where a video format is generally YUV, and in this case, a loaded pixel component is luminance information Y.

Specifically, the calculating a block direct current component by the first calculation unit 511 may be specifically: calculating an average value of pixel luminance information Y of each macroblock that is obtained by dividing the loaded rows according to the size of N*N, and using the average value as a direct current component $DC0_0$ of the macroblock, that is, $$\frac{1}{N^2}\sum_{i,j} Y_{ij};$$

and loading pixel luminance information of the second N rows, and calculating a block direct current component $DC0_1$; loading pixel luminance information of the third N rows, and calculating a block direct current component $DC0_2$; and loading pixel luminance information of the $L^{th}$ N rows, and calculating a block direct current component $DC0_L$.

A second acquiring unit 512 is configured to acquire pixel luminance information of a reference pixel block, in the reference frame corresponding to the current video frame, corresponding to the unit pixel block located within the range of the current row and the total L surrounding rows within the current video frame.

A second calculation unit 513 is configured to calculate a block direct current component of the reference pixel block according to the pixel luminance information of the reference pixel block.

Specifically, specific operations of acquiring the pixel luminance information by the second acquiring unit 512 and the first acquiring subunit 510a are the same.

Specifically, specific operations of calculating the block direct current components by the second calculation unit 513 and the first calculation unit 511 are the same.

A first comparison unit 514 is configured to compare the acquired block direct current component of the unit pixel block located within the range of the current row and the total L surrounding rows within the current video frame with the direct current component of the reference pixel block, in the reference frame, corresponding to the unit pixel block within the range of the current row and the total L surrounding rows within the current video frame.

Specifically, the comparing the block direct current components by the first comparison unit 514 is specifically: determining a range within the L rows according to a current macroblock and based on a width of a picture and a height of the search window; comparing a direct current component $DC0_{ij}$ of a current block of the current frame with a direct current component $DC1_{ij}$ of a block at a corresponding location of the reference frame, to obtain $fFlag_{ij}$, where $fFlag_{ij}$ is obtained by using the following equation:

$$fFlag_{ij} = \begin{cases} 1 & DC0_{ij} < DC1_{ij} \\ 0 & DC0_{ij} > DC1_{ij} \end{cases}.$$

A first determining unit 515 is configured to collect statistics on a comparison result of the direct current components, and determine, according to a statistics collection result, whether fade-in/fade-out exists, which specifically includes the following steps.

Specifically, the determining whether fade-in/fade-out exists by the first determining unit 515 is specifically: collecting statistics on the comparison result of the direct current components, collecting statistics on a quantity $fNum_g$ of current blocks, of the current frame, satisfying that a direct current component $DC0_{ij}$ is less than a direct current component $DC1_{ij}$ of a block at a corresponding location of the reference frame, and similarly collecting statistics on a quantity $foNum_g$ of current blocks, of the current frame, satisfying that a direct current component $DC0_{ij}$ is greater than a direct current component $DC1_{ij}$ of a block at a corresponding location of the reference frame, where $fiNum_g = \Sigma fFlag_{ij}$; and $foNum_g = \Sigma(1 - fFlag_{ij})$; and if $fiNum_g > R$ or $foNum_g > R$, considering that fade-in/fade-out exists in a current row, determining that the fade-in/fade-out is global fade-in/fade-out, and going to a first processing unit 516; or if $fiNum_g \leq R$ and $foNum_g \leq R$, considering that no global fade-in/fade-out exists in a current row, and going to the second acquiring subunit 510b of the first acquiring unit 510, where $R = L*(width - D0)$, L is the acquired current row and total L surrounding rows within the current video frame, width is a quantity of blocks in one row of a frame picture, and D0 is an error value of a quantity of blocks, in one row, having a letter box.

The first processing unit 516 is configured to: when it is detected that fade-in/fade-out exists in a current row, consider that global fade-in/fade-out exists, and mark all unit pixel blocks in the current row, so that a weighted prediction mode is used during motion match.

The second acquiring subunit 510b is configured to: when it is detected that no global fade-in/fade-out exists, acquire, within the range of the detected current row and total L surrounding rows within the current frame, the pixel luminance information within a rectangular area whose center is a current block and that has a predetermined size.

Specifically, specific operations of acquiring the pixel luminance information by the second acquiring subunit 510b and the first acquiring subunit 510a are the same, and the luminance information acquired by the second acquiring subunit 510b is fed back to the first calculation unit 511.

The first calculation unit 511 is further configured to calculate, on a block basis according to the acquired pixel luminance information that is acquired within the range of the detected current row and total L surrounding rows within the current frame and that is within the rectangular area whose center is the current block and that has the predetermined size, a direct current component of a unit pixel block located within the rectangular area whose center is the current block and that has the predetermined size, to acquire the block direct current component of the unit pixel block.

The second acquiring unit 512 is further configured to acquire pixel luminance information of a reference pixel block, in the reference frame corresponding to the current video frame, corresponding to the unit pixel block located within the rectangular area whose center is the current block and that has the predetermined size.

The first comparison unit 514 is further configured to compare the acquired block direct current component of the unit pixel block located within the rectangular area whose center is the current block and that has the predetermined size with the direct current component, of the reference pixel block in the reference frame, corresponding to the direct current component of the unit pixel block located within the rectangular area whose center is the current block and that has the predetermined size.

Specifically, the comparing the block direct current components by the first comparison unit 514 is specifically: determining a range within the L rows according to a current macroblock and based on a width of a picture and a height of the search window; comparing a direct current component $DC0_{ij}$ of the current block of the current frame with a direct current component $DC1_{ij}$ of a block at a corresponding location of the reference frame, to obtain $fFlag_{ij}$, where $fFlag_{ij}$ is obtained by using the following equation:

$$fFlag_{ij} = \begin{cases} 1 & DC0_{ij} < DC1_{ij} \\ 0 & DC0_{ij} > DC1_{ij} \end{cases}.$$

The first determining unit 515 is configured to collect statistics on a comparison result of the direct current components, and determine, according to a statistics collection result, whether fade-in/fade-out exists.

Specifically, the collecting statistics on the comparison results of the block direct current components by the first determining unit 515 is specifically: collecting statistics on the comparison result of the direct current components, collecting statistics on a quantity $fiNum_g$ of current blocks, of the current frame, satisfying that a direct current component $DC0_{ij}$ is less than a direct current component $DC1_{ij}$ of a block at a corresponding location of the reference frame, and collecting statistics on a quantity $foNum_g$ of current blocks, of the current frame, satisfying that a direct current component $DC0_{ij}$ is greater than a direct current component $DC1_{ij}$ of a block at a corresponding location of the reference frame, where $fiNum_g = \Sigma fFlag_{ij}$; and $foNum_g = \Sigma(1 - fFlag_{ij})$; and if $fiNum_g > R$ or $foNum_g > R$, considering that fade-in/fade-out exists in a current to-be-processed block, determining that the fade-in/fade-out is local fade-in/fade-out, and going to the first processing unit 516, where a size of a local area is P×Q, P and Q are natural numbers greater than 1, and Q is less than the height of the search window, and ensures that the local area is within the picture; and $R = blkNums - D1$, where blkNum: is a quantity of macroblocks within the local area, and D1 is an allowed error quantity of blocks.

The first processing unit 516 is further configured to mark a current to-be-processed block, so that the weighted prediction mode is used during motion match.

In the video frame fade-in/fade-out detection apparatus 500 provided in this embodiment of the present invention, pixel luminance information within a range of a current row and total L surrounding rows within a current video frame is acquired, and meanwhile, a direct current component of a unit pixel block is calculated according to the acquired pixel luminance information. Moreover, once a block is acquired, the block is detected, and processing on a current to-be-processed row is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. In a case in which it is detected that no fade-in/fade-out exists in the current row, the pixel luminance information within a rectangular area whose center is a current block and that has a predetermined size is further acquired within the range of the detected current row and total L surrounding rows within the current frame, and a direct current component of a unit pixel block is synchronously calculated according to the acquired pixel luminance information. Moreover, once a block is acquired, the block is detected, and processing on a current to-be-processed block is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. Therefore, the method provided in this embodiment achieves beneficial effects of avoiding a delay, saving a bandwidth, and improving motion estimation match accuracy. Moreover, fade-in/fade-out detection is first performed on the current to-be-processed row of some rows, and block fade-in/fade-out detection is further performed, in the rectangular area whose center is the current block, that has the predetermined size, and that is within the rows, on the current to-be-processed block. The method further reduces a detection amount, thereby performing processing more quickly, further avoiding a delay and saving a bandwidth, and further improving motion estimation match accuracy.

Embodiment 6

Figure 6:
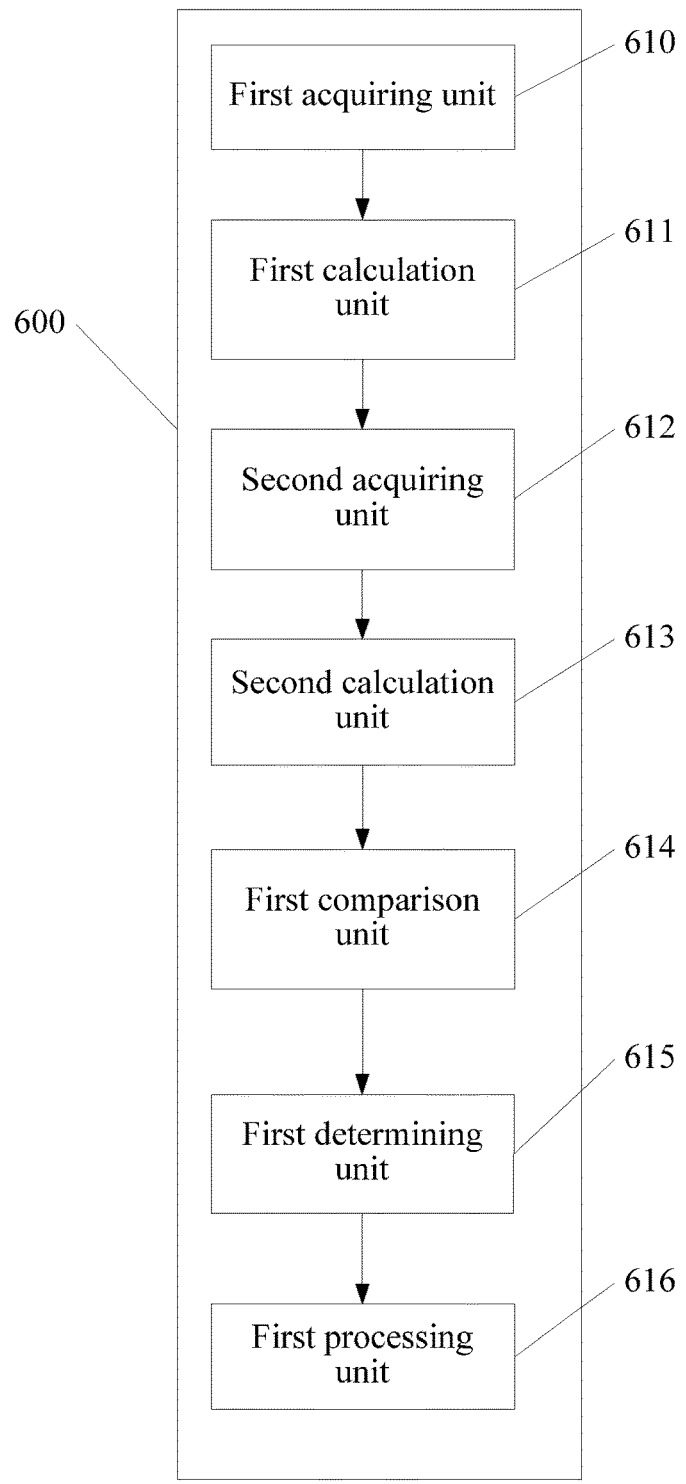
FIG. 6 is a schematic diagram of still another video frame fade-in/fade-out detection apparatus according to an embodiment.

This embodiment provides another video frame fade-in/fade-out detection apparatus 600. Referring to FIG. 6, the apparatus specifically includes a first acquiring unit 610, configured to acquire pixel luminance information within a rectangular area whose center is a current block, that has a predetermined size, and that is set within a current video frame. Also included is a first calculation unit 611, configured to calculate, on a block basis according to the pixel luminance information within the rectangular area whose center is the current block, that has the predetermined size, and that is set within the current video frame, a direct current component of a unit pixel block located within the rectangular area whose center is the current block, that has the predetermined size, and that is set within the current video frame, to acquire the block direct current component of the unit pixel block.

Specifically, the acquiring pixel luminance information by the first acquiring unit 610 is specifically: setting a size of a search window to H*M, and a size of a block to N*N; and based on the block with the size of N*N, loading pixel luminance information of the first N rows of the current frame, where a video format is generally YUV, and in this case, a loaded pixel component is luminance information Y.

Specifically, the calculating a block direct current component by the first calculation unit 611 may be specifically calculating an average value of pixel luminance information Y of each macroblock that is obtained by dividing the loaded rows according to the size of N*N, and using the average value as a direct current component $DC0_0$ of the macroblock, that is, $$\frac{1}{N^2} \sum_{i,j} Y_{ij};$$

and loading pixel luminance information of the second N rows, and calculating a block direct current component $DC0_1$; loading pixel luminance information of the third N rows, and calculating a block direct current component $DC0_2$; and loading pixel luminance information of the $L^{th}$ N rows, and calculating a block direct current component $DC0_L$.

Also included is second acquiring unit 612, configured to acquire pixel luminance information of a reference pixel block, in a reference frame corresponding to the current video frame, corresponding to the unit pixel block located within the rectangular area whose center is the current block, that has the predetermined size, and that is set within the current video frame. Also included is a second calculation unit 613, configured to calculate a block direct current component of the reference pixel block according to the pixel luminance information of the reference pixel block.

Specifically, specific operations of acquiring the pixel luminance information by the second acquiring unit 612 and the first acquiring unit 610 are the same.

Specifically, specific operations of calculating the block direct current components by the second calculation unit 613 and the first calculation unit 611 are the same. a first comparison unit 614, configured to compare the acquired block direct current component of the unit pixel block located within the rectangular area whose center is the current block, that has the predetermined size, and that is set within the current video frame with the direct current component, of the reference pixel block in the reference frame, corresponding to the direct current component of the unit pixel block located within the rectangular area whose center is the current block, that has the predetermined size, and that is set within the current video frame;

Specifically, the comparing the block direct current components by the first comparison unit 614 is specifically: determining a range of a rectangular area of a size according to a current macroblock based on a width of a picture and a height of the search window; comparing a direct current component $DC0_{ij}$ of the current block of the current frame with a direct current component $DC1_{ij}$ of a block that is at a corresponding location of the reference frame and that is pointed at by a time-domain motion vector of the current block (if the location of the corresponding block, which is pointed at, of the reference frame exceeds the search window, a block, closest to the corresponding block, within the search window is acquired), to obtain $fFlag_{ij}$, where $fFlag_{ij}$ is obtained by using the following equation:

$$fFlag_{ij} = \begin{cases} 1 & DC0_{ij} < DC1_{ij} \\ 0 & DC0_{ij} > DC1_{ij} \end{cases}.$$

Also included is a first determining unit 615, configured to collect statistics on a comparison result of the direct current components, and determine, according to a statistics collection result, whether fade-in/fade-out exists, which specifically includes the following steps:

Specifically, the determining whether fade-in/fade-out exists by the first determining unit 615 is specifically: collecting statistics on the comparison result of the direct current components, collecting statistics on a quantity fiNum$_g$ of macroblocks that are among all macroblocks within a local area whose center is a current block of the current frame and that satisfy that a direct current component DC0$_{ij}$ is less than direct current components DC1$_{ij}$ of all macroblocks within a local area whose center is a block at a specified location of the reference frame, and similarly collecting statistics on a quantity foNum$_g$ of macroblocks that are among all macroblocks within a local area whose center is a current block of the current frame and that satisfy that a direct current component DC0$_{ij}$ is greater than direct current components DC1$_{ij}$ of all macroblocks within a local area whose center is a block at a specified location of the reference frame, where $$fiNum_g = \Sigma fFlag_{ij}; \text{ and}$$

$$foNum_g = \Sigma (1 - fFlag_{ij}); \text{ and}$$

if fiNum$_g$>R or foNum$_g$>R, considering that fade-in/fade-out exists in a current to-be-processed block, determining that the fade-in/fade-out is local fade-in/fade-out, and going to a first processing unit 616, where a size of a local area is P×Q, P and Q are natural numbers greater than 1, and Q is less than the height of the search window, and ensures that the local area is within the picture; and R=blkNums−D1, where blkNum is a quantity of macroblocks within the local area, and D1 is an allowed error quantity of blocks.

The first processing unit 616 is configured to mark a current to-be-processed block, so that the weighted prediction mode is used during motion match.

In the video frame fade-in/fade-out detection apparatus 600 provided in this embodiment of the present invention, pixel luminance information within a rectangular area whose center is a current block, that has a predetermined size, and that is set within a current video frame is acquired, and meanwhile, a direct current component of a unit pixel block is calculated according to the acquired pixel luminance information. Moreover, once a block is acquired, the block is detected, and processing on a current to-be-processed block is performed in time, and no entire-frame detection needs to be performed on a current picture before processing, thereby avoiding a delay caused by the fact that in the prior art, entire-frame detection is performed before processing. Moreover, pixel luminance information is acquired, and meanwhile, a direct current component of a unit pixel block is calculated; fade-in/fade-out is detected, and meanwhile, whether to perform weighted prediction is determined in time; therefore, this synchronous running mode enables the method to save a sum of bandwidths resulting from hardware implementation and motion estimation. Finally, because fade-in/fade-out is detected in time and processing is performed in time, motion estimation match accuracy is improved. Therefore, the method provided in this embodiment achieves beneficial effects of avoiding a delay, saving a bandwidth, and improving motion estimation match accuracy.

It should be noted that, for the foregoing method embodiments, for simplicity of description, the method embodiments are described as a combination of a series of actions, but it should be clear to a person skilled in the art that the present invention is not limited by the order of the actions, as some steps can, in accordance with the present invention, be performed in other orders or concurrently. Next, a person skilled in the art should also know that, the embodiments described in the specification all fall within exemplary embodiments, and the related actions and modules are not necessarily required by the present invention.

In the foregoing embodiments, description of each embodiment has its focus. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a read-only memory (Read-Only Memory, ROM), a random access memory (Random Access Memory, RAM), a removable hard disk, a magnetic disk, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
   acquiring pixel luminance information within a preset area of a current video frame;
   calculating, according to the acquired pixel luminance information, a respective direct current component of each of a plurality of unit pixel blocks located within the preset area of the current video frame, to acquire a respective block direct current component of each of the plurality of unit pixel blocks;

acquiring pixel luminance information of a plurality of reference pixel blocks, wherein the plurality of reference pixel blocks are comprised in a reference frame corresponding to the current video frame, and each reference pixel block of the plurality of reference pixel blocks corresponds to a unit pixel block of the plurality of unit pixel blocks;

calculating a respective block direct current component of each of the plurality of reference pixel blocks according to the pixel luminance information of the plurality of reference pixel blocks;

separately for each unit pixel block of the plurality of unit pixel blocks, comparing the respective block direct current component of the respective unit pixel block with the respective direct current component of the respective reference pixel block in the reference frame that corresponds to the respective unit pixel block;

collecting statistics on a plurality of comparison results of comparing the respective block direct current component of each unit pixel block of the plurality of unit pixel blocks with the respective direct current component of the respective reference pixel block of the plurality of reference pixel blocks that corresponds to the respective unit pixel block, and determining, according to a statistics collection result, whether fade-in/fade-out exists; and marking, when it is detected that fade-in/fade-out exists, a current to-be-processed object, so that motion match is performed using a weighted prediction mode.

2. The method according to claim 1, wherein separately for each unit pixel block of the plurality of unit pixel blocks, comparing the respective block direct current component of the respective unit pixel with the respective direct current component of the respective reference pixel block in the reference frame that corresponds to the respective unit pixel block, comprises:

separately for each unit pixel block of the plurality of unit pixel blocks, comparing the respective block direct current component ($DC0_{ij}$) of the respective unit pixel block with the respective direct current component ($DC1_{ij}$) of the respective reference pixel block in the reference frame that corresponds to the respective unit pixel block, to obtain a respective $fFlag_{ij}$, wherein each respective $fFlag_{ij}$ obtained according to the relation:

$$fFlag_{ij} = \begin{cases} 1 & DC0_{ij} < DC1_{ij} \\ 0 & DC0_{ij} > DC1_{ij} \end{cases};$$

and wherein the collecting statistics on the plurality of comparison results of comparing the respective block direct current component of each unit pixel block of the plurality of unit pixel blocks with the respective direct current component of the respective reference pixel block of the plurality of reference pixel blocks that corresponds to the respective unit pixel block, and determining, according to a statistics collection result, whether fade-in/fade-out exists comprises:

separately collecting statistics according to the relations:

$fiNum_g = \Sigma fFlag_{ij}$; and $foNum_g = \Sigma(1 - fFlag_{ij})$;

wherein $fiNum_g$ indicates a quantity of unit pixel blocks within the preset area of the current video frame for which the respective block direct current component ($DC0_{ij}$) is less than the respective direct current component ($DC1_{ij}$) of the corresponding reference pixel block in the reference frame, and $foNum_g$ indicates a quantity of unit pixel blocks within the preset area of the current video frame for which the respective block direct current component ($DC0_{ij}$) is greater than the respective direct current component ($DC1_{ij}$) of the corresponding reference pixel block in the reference frame; and determining that fade-in/fade-out exists within the preset area of the current video frame when $fiNum_g > R$ or $foNum_g > R$, wherein R is a preset threshold for determining fade-in/fade-out.

3. The method according to claim 1, wherein acquiring the pixel luminance information within the preset area of the current video frame comprises acquiring the pixel luminance information within a range of a current row and a total of L surrounding rows within the current video frame;

wherein the calculating, according to the acquired pixel luminance information within the preset area of the current video frame, the respective direct current component of each of the plurality of unit pixel blocks located within the preset area of the current video frame, to acquire the respective block direct current component of each of the plurality of unit pixel blocks comprises:

calculating, according to the pixel luminance information within the range of the current row and the total of L surrounding rows within the current video frame, the respective direct current component of each of a plurality of unit pixel blocks located within the range of the current row and the total L surrounding rows within the current video frame, to acquire the respective block direct current component of each of the plurality of unit pixel blocks;

wherein the acquiring pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks comprises:

acquiring pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks located within the range of the current row and the of total L surrounding rows within the current video frame;

wherein separately for each unit pixel block of the plurality of unit pixel blocks, comparing the respective block direct current component of the respective unit pixel block with the respective direct current component of the respective reference pixel block in the reference frame that corresponds to the respective unit pixel block comprises:

separately for each unit pixel block of the plurality of unit pixel blocks, comparing the respective block direct current component of the respective unit pixel block located within the range of the current row and the total of L surrounding rows within the current video frame with the respective direct current component of the respective reference pixel block in the reference frame that corresponds to the respective unit pixel block of the plurality of unit pixel blocks located within the range of the current row and the total of L surrounding rows within the current video frame; and wherein marking, when it is detected that fade-in/fade-out exists, the current to-be-processed object, so that motion match is performed by using the weighted prediction mode, comprises:

marking, when it is detected that fade-in/fade-out exists, all unit pixel blocks located within the current row within the current video frame, so that the motion match is performed by using the weighted prediction mode.

4. The method according to claim 3, wherein R is calculated according to the relation R=L* (width−D0), wherein L is the acquired current row and total of L surrounding rows within the current video frame, width is a quantity of blocks in one row of a frame picture, and D0 is an error value of a quantity of blocks, in one row, having a letter box.

5. The method according to claim 3, wherein it is detected that no fade-in/fade-out exists, and acquiring the pixel luminance information within the preset area of the current video frame further comprises acquiring, within the range of the current row and the total of L surrounding rows within the current frame, the pixel luminance information within a rectangular area whose center is a current block and that has a predetermined size;

wherein the calculating, according to the acquired pixel luminance information, the respective direct current component of each of the plurality of unit pixel blocks located within the preset area of the current video frame, to acquire the respective block direct current component of each of the plurality of unit pixel blocks comprises:

calculating, according to the acquired pixel luminance information that is acquired within the range of the current row and the total of L surrounding rows within the current frame and that is within the rectangular area whose center is the current block and that has the predetermined size, the respective direct current component of each of the plurality of unit pixel blocks located within the rectangular area whose center is the current block and that has the predetermined size, to acquire the respective block direct current component of each of the plurality of unit pixel blocks;

wherein acquiring the pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks, comprises:

acquiring pixel luminance information of the plurality of reference pixel blocks, wherein the plurality of reference pixel blocks are comprised in the reference frame corresponding to the current video frame, and each reference pixel block of the plurality of reference pixel blocks corresponds to a respective unit pixel block of the plurality of unit pixel blocks located within the rectangular area whose center is the current block and that has the predetermined size;

wherein separately for each unit pixel block of the plurality of unit pixel blocks, comparing the respective block direct current component of the respective unit pixel block with the respective direct current component of the respective reference pixel block in the reference frame that corresponds to the respective unit pixel comprises:

separately for each unit pixel block of the plurality of unit pixel blocks, comparing the respective block direct current component of the respective unit pixel block located within the rectangular area whose center is the current block and that has the predetermined size with the respective direct current component of the respective reference pixel block in the reference frame that corresponds to the respective unit pixel block located within the rectangular area whose center is the current block and that has the predetermined size; and wherein marking, when it is detected that fade-in/fade-out exists, the current to-be-processed object, so that motion match is performed by using the weighted prediction mode comprises:

marking a current unit pixel block located within the current video frame, so that the motion match is performed by using the weighted prediction mode.

6. The method according to claim 1, wherein acquiring the pixel luminance information within the preset area of the current video frame comprises acquiring the pixel luminance information within a rectangular area whose center is a current block, that has a predetermined size, and that is set within the current video frame;

wherein calculating, according to the acquired pixel luminance information, the respective direct current component of each of the plurality of unit pixel blocks located within the preset area of the current video frame, to acquire the respective block direct current component of each of the plurality of unit pixel blocks further comprises:

calculating, according to the pixel luminance information within the rectangular area whose center is the current block, that has the predetermined size, and that is set within the current video frame, the respective direct current component of each of the plurality of unit pixel blocks located within the rectangular area whose center is the current block, that has the predetermined size, and that is set within the current video frame, to acquire the respective block direct current component of each of the plurality of unit pixel blocks;

wherein acquiring the pixel luminance information of the plurality of reference pixel blocks, wherein the plurality of reference pixel blocks are comprised in the reference frame corresponding to the current video frame, and each reference pixel block of the plurality of reference pixel blocks corresponds to the plurality of unit pixel blocks located within the preset area of the current video frame comprises:

acquiring the pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks located within the rectangular area whose center is the current block, that has the predetermined size, and that is set within the current video frame;

wherein separately for each unit pixel block of the plurality of unit pixel blocks, comparing the respective block direct current component of the respective unit pixel block located within the preset area of the current video frame with the respective direct current component of the respective reference pixel block in the reference frame that corresponds to the respective unit pixel block comprises:
  separately for each unit pixel block of the plurality of unit pixel blocks, comparing the respective block direct current component of the respective unit pixel block of the plurality of unit pixel blocks located within the rectangular area whose center is the current block, that has the predetermined size, and that is set within the current video frame with the respective direct current component of the respective reference pixel block in the reference frame that corresponds to the respective unit pixel block; and
  wherein marking, when it is detected that fade-in/fade-out exists, the current to-be-processed object, so that motion match is performed by using the weighted prediction mode comprises:
    marking a current unit pixel block located within the current video frame, so that the motion match is performed by using the weighted prediction mode.

7. The method according to claim 6, wherein R is determined according to the relation R=blkNums−D1, wherein blkNums indicates a quantity of blocks within the rectangular area whose center is the current block, that has a size, and that is set within the acquired current video frame, and D1 indicates an allowed error quantity of blocks.

8. An apparatus, comprising:
  a processor; and
  a non-transitory computer-readable storage medium storing a program to be executed by the processor, the program including instructions for:
    acquiring pixel luminance information within a preset area of a current video frame;
    calculating, according to the acquired pixel luminance information within the preset area of the current video frame, a respective direct current component of each of a plurality of unit pixel blocks located within the preset area of the current video frame, to acquire a respective block direct current component of each of the plurality of unit pixel blocks;
    acquiring pixel luminance information of a plurality of reference pixel blocks, wherein the plurality of reference pixel blocks are comprised in a reference frame corresponding to the current video frame, and wherein each reference pixel block of the plurality of reference pixel blocks corresponds to a unit pixel block of the plurality of unit pixel blocks;
    calculating a respective block direct current component of each reference pixel block of the plurality of reference pixel blocks according to the pixel luminance information of the plurality of reference pixel blocks;
    separately for each unit pixel block of the plurality of unit pixel blocks, comparing the respective block direct current component of the respective unit pixel block with the respective direct current component of the respective reference pixel block in the reference frame that corresponds to the respective unit pixel block;
    collecting statistics on a plurality of comparison results of comparing the respective block direct current component of each unit pixel block with the respective direct current component of the respective reference pixel block that corresponds to the respective unit pixel block, and determine, according to a statistics collection result, whether fade-in/fade-out exists; and
    marking, in response to detecting that fade-in/fade-out exists, a current to-be-processed object, so that motion match is performed by using a weighted prediction mode.

9. The apparatus according to claim 8, wherein the program further includes instructions for:
  separately for each unit pixel block of the plurality of unit pixel blocks, comparing the respective block direct current component ($DC0_{ij}$) of the respective unit pixel block located within the preset area of the current video frame with the respective direct current component ($DC1_{ij}$), of the respective reference pixel block in the reference frame that corresponds to the respective unit pixel block, to obtain a respective $fFlag_{ij}$, wherein each respective $fFlag_{ij}$ is obtained according to the relation:

$$fFlag_{ij} = \begin{cases} 1 & DC0_{ij} < DC1_{ij} \\ 0 & DC0_{ij} > DC1_{ij} \end{cases};$$

and
separately collecting statistics according to the relations:

$fiNum_g = \Sigma fFlag_{ij}$; and $foNum_g = \Sigma(1 - fFlag_{ij})$;

wherein $fiNum_g$ indicates a quantity of unit pixel blocks within the preset area of the current video frame for which the respective block direct current component ($DC0_{ij}$) is less than the respective direct current component ($DC1_{ij}$), of the corresponding reference pixel block in the reference frame, and $foNum_g$ indicates a quantity of unit pixel blocks within the preset area of the current video frame for which the respective block direct current component ($DC0_{ij}$) is greater than the respective direct current component ($DC1_{ij}$), of the corresponding reference pixel block in the reference frame; and
  determining, in response to determining that $fiNum_g > R$ or $foNum_g > R$, that fade-in/fade-out exists in the preset area of the current video frame, wherein R indicates a preset threshold for determining fade-in/fade-out.

10. The apparatus according to claim 8, wherein the program further includes instructions for:
  acquiring the pixel luminance information within a range of a current row and a total of L surrounding rows within the current video frame;
  calculating, according to the pixel luminance information within the range of the current row and the total of L surrounding rows within the current video frame, a respective direct current component of each unit pixel block of a plurality of unit pixel blocks located within the range of the current row and the total L surrounding rows within the current video frame, to acquire the respective block direct current component of each of the plurality of unit pixel blocks;
  acquiring pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks located within the range of the current row and the total L surrounding rows within the current video frame;
  separately for each unit pixel block of the plurality of unit pixel blocks, comparing the respective block direct current component of the respective unit pixel block located within the range of the current row and the total L surrounding rows within the current video frame with the respective direct current component of the respective reference pixel block in the reference frame that corresponds to the respective unit pixel block of the plurality of unit pixel blocks located within the range of the current row and the total L surrounding rows within the current video frame; and marking, when it is detected that fade-in/fade-out exists, all unit pixel blocks located within the current row within the current video frame, so that the motion match is performed by using the weighted prediction mode.

11. The apparatus according to claim 10, wherein R is obtained according to the relation R=L* (width−D0), wherein L indicates the acquired current row and total L surrounding rows within the current video frame, width indicates a quantity of blocks in one row of a frame picture, and D0 indicates an error value of a quantity of blocks, in one row, having a letter box.

12. The apparatus according to claim 10, wherein the program determines that that no fade-in/fade-out exists, and the program further includes instructions for:

acquiring, within the range of the current row and total of L surrounding rows within the current frame, pixel luminance information within a rectangular area whose center is a current block and that has a predetermined size;

calculating, according to the acquired pixel luminance information that is acquired within the range of the detected current row and total of L surrounding rows within the current frame and that is within the rectangular area whose center is the current block and that has the predetermined size, a respective direct current component of each of the plurality of unit pixel blocks located within the rectangular area whose center is the current block and that has the predetermined size, to acquire the respective block direct current component of each of the plurality of unit pixel blocks;

acquiring pixel luminance information of the plurality of reference pixel blocks, wherein the plurality of reference pixel blocks are comprised in the reference frame corresponding to the current video frame, and each reference pixel block of the plurality of reference pixel blocks corresponds to a respective unit pixel block of the plurality of unit pixel blocks located within the rectangular area whose center is the current block and that has the predetermined size;

separately for each unit pixel block of the plurality of unit pixel blocks, comparing the respective block direct current component of the respective unit pixel block located within the rectangular area whose center is the current block and that has the predetermined size with the respective direct current component of the respective reference pixel block in the reference frame that corresponds to the respective unit pixel block located within the rectangular area whose center is the current block and that has the predetermined size; and marking a current unit pixel block located within the current video frame, so that the motion match is performed by using the weighted prediction mode.

13. The apparatus according to claim 8, wherein the program further includes instructions for:

acquiring the pixel luminance information within a rectangular area whose center is a current block, that has a predetermined size, and that is set within the current video frame;

calculating, according to the pixel luminance information within the rectangular area whose center is the current block, that has the predetermined size, and that is set within the current video frame, the respective direct current component of each of the plurality of unit pixel blocks located within the rectangular area whose center is the current block, that has the predetermined size, and that is set within the current video frame, to acquire the respective block direct current component of each of the plurality of unit pixel blocks;

acquiring the pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks located within the rectangular area whose center is the current block, that has the predetermined size, and that is set within the current video frame;

separately for each unit pixel block of the plurality of unit pixel blocks, comparing the respective block direct current component of the respective unit pixel block of the plurality of unit pixel blocks located within the rectangular area whose center is the current block, that has the predetermined size, and that is set within the current video frame with the respective direct current component of the respective reference pixel block in the reference frame that corresponds to the respective direct current component of the respective unit pixel block; and marking a current unit pixel block located within the current video frame, so that the motion match is performed by using the weighted prediction mode.

14. The apparatus according to claim 13, wherein R is obtained according to the relation R=blkNums−D1, wherein blkNums is a quantity of blocks within the rectangular area whose center is the current block, hat has the predetermined size, and that is set within the current video frame, and D1 is an allowed error quantity of blocks.

15. A method, comprising:

acquiring pixel luminance information within a preset area of a current video frame;

calculating, according to the acquired pixel luminance information, a respective direct current component of each of a plurality of unit pixel blocks located within the preset area of the current video frame, to acquire the respective block direct current component of each of the plurality of unit pixel blocks;

acquiring pixel luminance information of a plurality of reference pixel blocks, in a reference frame corresponding to the current video frame, wherein each reference pixel block of the plurality of reference pixel blocks corresponds to a unit pixel block of the plurality of unit pixel blocks;

calculating a respective block direct current component of each of the plurality of reference pixel blocks according to the pixel luminance information of the plurality of reference pixel blocks;

separately for each unit pixel block of the plurality of unit pixel blocks, comparing the respective block direct current component of the respective unit pixel block with the respective direct current component of the respective reference pixel block in the respective reference frame that corresponds to the respective unit pixel block;

collecting statistics on a plurality of comparison results of comparing the respective block direct current component of each unit pixel block of the plurality of unit pixel blocks with the respective direct current component of the respective reference pixel block of the plurality of reference pixel blocks that corresponds to the respective unit pixel block, and determining, according to a statistics collection result, whether fade-in/fade-out exists;

marking, when it is detected that fade-in/fade-out exists, a current to-be-processed object, so that motion match is performed using a weighted prediction mode; and displaying, on a display screen, a plurality of video frames according to the motion match.

16. The method according to claim 15, further comprising:

receiving, by a receiver, the plurality of video frames.

17. The method according to claim 15, wherein separately for each unit pixel block of the plurality of unit pixel blocks, comparing the respective block direct current component of the respective unit pixel block with the respective direct current component of the respective reference pixel block in the respective reference frame that corresponds to the respective direct current component of the unit pixel block located within the preset area of the current video frame, comprises:

separately for each unit pixel block of the plurality of unit pixel blocks, comparing the respective block direct current component ($DC0_{ij}$) of the respective unit pixel located within the preset area of the current video frame with the respective direct current component ($DC1_{ij}$), of the respective reference pixel block in the reference frame that corresponds to the respective unit pixel block to obtain a respective $fFlag_{ij}$, wherein each respective $fFlag_{ij}$ is obtained according to the relation:

$$fFlag_{ij} = \begin{cases} 1 & DC0_{ij} < DC1_{ij} \\ 0 & DC0_{ij} > DC1_{ij} \end{cases};$$

and wherein collecting the statistics on the plurality of comparison results of comparing the respective block direct current component of each unit pixel block of the plurality of unit pixel blocks with the respective direct current component of the respective reference pixel block of the plurality of reference pixel blocks that corresponds to the respective unit pixel block, and determining, according to a statistics collection result, whether fade-in/fade-out exists comprises:

separately collecting statistics according to the relations:

$fiNum_g = \Sigma fFlag_{ij}$; and $foNur_g = \Sigma(1 - fFlag_{ij})$;

wherein fiNum, indicates a quantity of unit pixel blocks within the preset area of the current video frame for which the respective block direct current component ($DC0_{ij}$) is less than the respective direct current component ($DC1_{ij}$) of the corresponding reference pixel block in the reference frame, and $foNum_g$ indicates a quantity of unit pixel blocks within the preset area of the current video frame for which the respective block direct current component ($DC0_{ij}$) is greater than the respective direct current component ($DC1_{ij}$) of the corresponding reference pixel block in the reference frame; and determining that fade-in/fade-out exists in the preset area of the current video frame when $fiNum_g > R$ or $foNum_g > R$, wherein R is a preset threshold for determining fade-in/fade-out.

18. The method according to claim 15, wherein acquiring the pixel luminance information within the preset area of the current video frame comprises acquiring the pixel luminance information within a range of a current row and a total of L surrounding rows within the current video frame;

wherein calculating, according to the acquired pixel luminance information within the preset area of the current video frame, the direct current component of each of the plurality of unit pixel blocks located within the preset area of the current video frame, to acquire the respective block direct current component of each of the plurality of unit pixel block comprises:

calculating, according to the pixel luminance information within the range of the current row and the total of L surrounding rows within the current video frame, a respective direct current component of each of a plurality of unit pixel blocks located within the range of the current row and the total L surrounding rows within the current video frame, to acquire the respective block direct current component of each of the plurality of unit pixel blocks;

wherein acquiring the pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks comprises:

acquiring the pixel luminance information of the plurality of reference pixel blocks, wherein the plurality of reference pixel blocks are comprised in the reference frame corresponding to the current video frame, and each reference pixel block of the plurality of reference pixel blocks corresponds to a unit pixel block of the plurality of unit pixel blocks located within the range of the current row and the of total L surrounding rows within the current video frame;

wherein separately for each unit pixel block of the plurality of unit pixel blocks, comparing the respective block direct current component of the respective unit pixel block located within the preset area of the current video frame with the respective direct current component of the respective reference pixel block in the reference frame that corresponds to the respective unit pixel block comprises:

separately for each unit pixel block of the plurality of unit pixel blocks, comparing the respective block direct current component of the respective unit pixel block located within the range of the current row and the total of L surrounding rows within the current video frame with the respective direct current component of the respective reference pixel block in the reference frame that corresponds to the respective unit pixel block located within the range of the current row and the total of L surrounding rows within the current video frame; and wherein marking, when it is detected that fade-in/fade-out exists, the current to-be-processed object, so that motion match is performed by using the weighted prediction mode, comprises:

marking all unit pixel blocks located within the current row within the current video frame, so that the motion match is performed by using the weighted prediction mode.

19. The method according to claim 18, wherein R is calculated according to the relation R=L* (width−D0), wherein L is the acquired current row and total of L surrounding rows within the current video frame, width is a quantity of blocks in one row of a frame picture, and D0 is an error value of a quantity of blocks, in one row, having a letter box.

* * * * *

UNITED STATES PATENT AND TRADEMARK OFFICE
CERTIFICATE OF CORRECTION

PATENT NO. : 10,257,518 B2
APPLICATION NO. : 14/924502
DATED : April 9, 2019
INVENTOR(S) : Zhang Page 1 of 1

It is certified that error appears in the above-identified patent and that said Letters Patent is hereby corrected as shown below:

In the Claims

Column 25, Lines 64-67, Claim 2, delete the equations and insert --
$$fiNum_g = \sum fFlag_{ij} \text{ ; and}$$
$$foNum_g = \sum (1 - fFlag_{ij});$$
--.

Column 30, Lines 24-26, Claim 9, delete the equations and insert --
$$fiNum_g = \sum fFlag_{ij} \text{ ; and}$$
$$foNum_g = \sum (1 - fFlag_{ij});$$
--.

Column 33, Lines 56-59, Claim 17, delete the equations and insert --
$$fiNum_g = \sum fFlag_{ij} \text{ ; and}$$
$$foNum_g = \sum (1 - fFlag_{ij});$$
--.

Column 33, Line 60, Claim 17, delete "fiNum" and insert --$fiNum_g$--.

Signed and Sealed this
Second Day of July, 2019

Andrei Iancu
*Director of the United States Patent and Trademark Office*